(12) United States Patent
Takanashi et al.

(10) Patent No.: US 9,632,386 B2
(45) Date of Patent: Apr. 25, 2017

(54) FINE PARTICLES FOR IMAGE DISPLAY, METHOD FOR PRODUCING THE SAME, ELECTROPHORETIC DISPERSION LIQUID, AND IMAGE DISPLAY DEVICE

(75) Inventors: Hidehiko Takanashi, Kanagawa (JP); Yuriko Kaino, Kanagawa (JP); Aya Shuto, Kanagawa (JP); Ken Kobayashi, Kanagawa (JP); Shinichiro Yamada, Kanagawa (JP); Seiichiro Tabata, Kanagawa (JP); Hironori Iida, Kanagawa (JP); Machiko Minatoya, Tokyo (JP); Shun Yamanoi, Kanagawa (JP); Masakazu Mitsugi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 13/701,280

(22) PCT Filed: Jun. 2, 2011

(86) PCT No.: PCT/JP2011/063191
§ 371 (c)(1),
(2), (4) Date: Jun. 10, 2013

(87) PCT Pub. No.: WO2011/158723
PCT Pub. Date: Dec. 22, 2011

(65) Prior Publication Data
US 2013/0250398 A1    Sep. 26, 2013

(30) Foreign Application Priority Data

Jun. 14, 2010  (JP) ................................. 2010-135019
Apr. 4, 2011   (JP) ................................. 2011-082692

(51) Int. Cl.
*A61K 47/02*     (2006.01)
*B32B 5/18*      (2006.01)
(Continued)

(52) U.S. Cl.
CPC .............. *G02F 1/167* (2013.01); *B82Y 30/00* (2013.01); *C09C 1/48* (2013.01);
(Continued)

(58) Field of Classification Search
None
See application file for complete search history.

(56) References Cited

U.S. PATENT DOCUMENTS 6,224,839 B1 *  5/2001  Fan et al. .................... 423/239.1
6,787,029 B2 *  9/2004  Gaudet et al. ............. 210/198.2
(Continued)

FOREIGN PATENT DOCUMENTS

CN    101541676 A    9/2009
DE    103 53 388 A1    6/2005
(Continued)

OTHER PUBLICATIONS

Machine translation JP 2003-186057 (2003).*
(Continued)

*Primary Examiner* — Alexandre Ferre
(74) *Attorney, Agent, or Firm* — Dentons US LLP

(57) ABSTRACT

The present inventions relate to fine particles for image display having excellent properties and displaying images in black. The fine particles for image display are dispersed (suspended) in an electrophoretic dispersion liquid sealed between two opposing substrates and contain porous carbon materials having values of specific surface area determined by the nitrogen BET method of not less than 100 $m^2/g$ and pore volume determined by the MP method of not less than 0.1 $cm^3/g$ or those having values of specific surface area determined by the nitrogen BET method of not less than 100 $m^2/g$ and at least one peak at not more than 10 nm in pore size distribution obtained by the non-localized density functional theory method.

16 Claims, 16 Drawing Sheets

(51) Int. Cl.
*C01B 31/08* (2006.01)
*G02F 1/167* (2006.01)
*C09C 1/48* (2006.01)
*B82Y 30/00* (2011.01)

(52) U.S. Cl.
CPC ............... *G02F 2001/1678* (2013.01); *G02F 2201/124* (2013.01); *G02F 2202/36* (2013.01)

(56) References Cited

U.S. PATENT DOCUMENTS

| | | | |
|---|---|---|---|
| 2002/0011185 A1* | 1/2002 | Belmont | 106/410 |
| 2006/0154815 A1* | 7/2006 | Abe et al. | 502/416 |
| 2007/0090034 A1* | 4/2007 | Ricker et al. | 210/198.2 |
| 2007/0268244 A1* | 11/2007 | Chopra et al. | 345/107 |
| 2009/0268274 A1* | 10/2009 | Masuzawa | G02F 1/167 359/296 |
| 2011/0002086 A1* | 1/2011 | Feaver et al. | 361/502 |
| 2012/0307347 A1* | 12/2012 | Clapp | G02B 26/005 359/296 |

FOREIGN PATENT DOCUMENTS

| | | | |
|---|---|---|---|
| EP | 1 961 789 A1 | 8/2008 | |
| JP | 2003186057 A * | 7/2003 | G02F 1/067 |
| JP | 2008-076492 | 4/2004 | |
| JP | 2004-354890 | 12/2004 | |
| JP | 2006-083345 | 3/2006 | |
| JP | 2008-008951 | 1/2008 | |
| JP | 2008-083266 | 4/2008 | |
| JP | 2008-224714 | 9/2008 | |
| JP | 2008287163 A * | 11/2008 | |
| JP | 2009-244328 | 10/2009 | |
| WO | WO/03/099941 A1 | 12/2003 | |

OTHER PUBLICATIONS

Machine translation JP 2008-287163 (2008).*
Seiichiro, Tabata et al., "Hierarchical porous carbon from cell assemblies of rice husk for in vivo applications", MedChemComm, vol. 1, No. 2, May 2010, pp. 136-138.
Yeletsky, P., et al, "Synthesis of mesoporous carbons by leaching out natural silica templates of rice husk", Microporous and Mesoporous Materials, vol. 121, No. 1-3, May 1, 2009, pp. 39-40, Elsevier Science Publishing, NY.
Yupeng, Guo, et al., "The preparation and mechanism studies of rice husk based porous carbon", Materials Chemistry and Physics, vol. 74, No. 3, Apr. 1, 2002, pp. 320-323.
Chinese Office Examination Report issued in connection with related Chinese Patent Application No. 201180027951.2 dated Nov. 2, 2014 with English translation.
Japanese Office Examination Report issued in connection with related Japanese patent application No. JP 2011-082692 dated Nov. 25, 2014 with English translation.

* cited by examiner (A)

(B)

(A)

(B)

(A)

(B)

(A)

(B)

(A)

(B)

(A)

(B)

(A)

(B)

(A)

(B)

(A)

(B)

(A)

(B)

FINE PARTICLES FOR IMAGE DISPLAY, METHOD FOR PRODUCING THE SAME, ELECTROPHORETIC DISPERSION LIQUID, AND IMAGE DISPLAY DEVICE

TECHNICAL FIELD

The present invention relates to fine particles for image display, a method for producing the same, an electrophoretic dispersion liquid, and an image display device.

BACKGROUND ART

An e-paper display has advantages such that it is flexible like paper, easy to read, cheap, and rewritable as needed as well as has a memory function depending on the constitution and structure and retains a display content without use of electric power and research and development thereof have been earnestly promoted. As one type of such e-paper displays, a display device in which electrophoresis is adopted has been known (hereinafter referred to as a "display device"). The display device is provided with a pair of substrates facing each other. A second electrode is disposed on a second substrate placed nearer to a viewer side and a first electrode is disposed on a first substrate facing the second substrate. A space between these substrates is filled with many charged electrophoretic particles and a dispersion medium which is different in color from the color of electrophoretic particles. Furthermore, pixels are divided by barriers preventing electrophoretic particles from uneven distribution as well as defining the space between a pair of substrates.

In a display device, for instance, when a positive voltage is applied to a first electrode and a negative voltage is applied to a second electrode while electrophoretic particles are positively charged, the positively charged electrophoretic particles move and gather to cover the second electrode. Therefore, when viewing a display device, the same color as the color of the electrophoretic particles is displayed. On the contrary, when a negative voltage is applied to the first electrode and a positive voltage is applied to the second electrode, the electrophoretic particles move and gather to cover the first electrode. Therefore, when viewing a display device, the same color as the color of a dispersion medium is displayed. Such application of a voltage to an electrode is performed to each pixel unit allowing for displaying any image.

CITATION LIST

Patent Document

Patent Document 1: Japanese Patent Application Laid-Open No. 2008-224714

SUMMARY OF THE INVENTION

Problems to be Solved by the Invention

Technologies using electrophoretic particles constituted with carbon black for displaying images in black are widely known (for example, refer to Japanese Patent Application Laid-Open No. 2008-224714). However, investigation by the present inventors has revealed that, when commercially available carbon black is used as electrophoretic particles, a display device having excellent properties cannot be obtained.

Therefore, an object of the present invention is to provide fine particles for image display having excellent properties and displaying images in black on the basis of electrophoresis, a method for producing the same, an electrophoretic dispersion liquid containing the fine particles for image display, and an image display device provided with the electrophoretic dispersion liquid.

Solutions to Problems

Fine particles for image display according to a first embodiment of the present invention for achieving the object are fine particles for image display, which are dispersed (suspended) in an electrophoretic dispersion liquid sealed between two opposing substrates for displaying an image and which contain porous carbon materials with specific surface area determined by the nitrogen BET method of not less than 100 $m^2/g$, preferably not less than 400 $m^2/g$ and pore volume determined by the MP method of not less than 0.1 $cm^3/g$, preferably not less than 0.2 $cm^3/g$, more preferably not less than 0.3 $cm^3/g$.

Fine particles for image display according to a second embodiment of the present invention for achieving the object are fine particles for image display, which are dispersed (suspended) in an electrophoretic dispersion liquid sealed between two opposing substrates for displaying images and which contain porous carbon materials having specific surface area determined by the nitrogen BET method of not less than 100 $m^2/g$, preferably not less than 400 $m^2/g$ and at least one peak at not more than 10 nm in pore size distribution obtained by the non-localized density functional theory method. A ratio of a total volume of pores having a pore size within a range of not more than 10 nm relative to a total volume of pores having a pore size within a range of not more than 50 nm is not less than 0.1, preferably not less than 0.2, more preferably not less than 0.3 but not more than 0.99. The same is applied hereinafter.

Fine particles for image display according to a third embodiment of the present invention for achieving the object are fine particles for image display, which are dispersed (suspended) in an electrophoretic dispersion liquid sealed between two opposing substrates for displaying images and which contain porous carbon materials with specific surface area determined by the nitrogen BET method of not less than 100 $m^2/g$, preferably not less than 400 $m^2/g$ and average particle size of not less than $1 \times 10^{-8}$ m but not more than $2 \times 10^{-4}$ m, preferably not less than $1 \times 10^{-8}$ m but not more than $2 \times 10^{-6}$ m, more preferably not less than $1 \times 10^{-8}$ m but not more than $5 \times 10^{-7}$ m.

Fine particles for image display according to a fourth embodiment of the present invention for achieving the object are fine particles for image display, which are dispersed (suspended) in an electrophoretic dispersion liquid sealed between two opposing substrates for displaying images and which contain porous carbon materials with an absolute value of a zeta potential of not less than 10 mV but not more than 200 mV.

A method for producing fine particles for image display according to the first embodiment of the present invention for achieving the object is a method for producing fine particles for image display which are dispersed (suspended) in an electrophoretic dispersion liquid sealed between two opposing substrates for displaying images and which contain porous carbon materials having specific surface area determined by the nitrogen BET method of not less than 100 $m^2/g$, preferably not less than 400 $m^2/g$ and pore volume determined by the MP method of not less than 0.1 $cm^3/g$, preferably not less than 0.2 cm$^3$/g, more preferably not less than 0.3 cm$^3$/g, wherein plant-based materials are carbonized at temperature from 500° C. to 1,400° C. For convenience, porous carbon materials obtained in this way are in some cases referred to as a "precursor for porous carbon materials" or "carbonaceous substances". The same is applied hereinafter.

A method for producing fine particles for image display according to the second embodiment of the present invention for achieving the object is a method for producing fine particles for image display, which are dispersed (suspended) in an electrophoretic dispersion liquid sealed between two opposing substrates for displaying images and which contain porous carbon materials having a specific surface area determined by the nitrogen BET method of not less than 100 m$^2$/g, preferably not less than 400 m$^2$/g and at least one peak at not more than 10 nm in pore size distribution obtained by the non-localized density functional theory method, wherein plant-based materials are carbonized at temperature from 500° C. to 1,400° C.

An electrophoretic dispersion liquid according to the first embodiment of the present invention for achieving the object is an electrophoretic dispersion liquid sealed between two opposing substrates for displaying images and containing fine particles for displaying images containing porous carbon materials having specific surface area determined by the nitrogen BET method of not less than 100 m$^2$/g, preferably not less than 400 m$^2$/g and pore volume determined by the MP method of not less than 0.1 cm$^3$/g, preferably not less than 0.2 cm$^3$/g, more preferably not less than 0.3 cm$^3$/g and with a dispersion liquid in which the fine particles for image display have been dispersed (suspended).

An electrophoretic dispersion liquid according to the second embodiment of the present invention for achieving the object is an electrophoretic dispersion liquid sealed between two opposing substrates for displaying images and containing fine particles for image display containing porous carbon materials having specific surface area determined by the nitrogen BET method of not less than 100 m$^2$/g, preferably not less than 400 m$^2$/g and at least one peak at not more than 10 nm in pore size distribution obtained by the non-localized density functional theory method and with a dispersion liquid in which the fine particles for image display have been dispersed (suspended).

An electrophoretic dispersion liquid according to the third embodiment of the present invention for achieving the object is an electrophoretic dispersion liquid for image display sealed between two opposing substrates for displaying images and containing fine particles containing porous carbon materials having specific surface area determined by the nitrogen BET method of not less than 100 m$^2$/g, preferably not less than 400 m$^2$/g and average particle diameter of not less than 1×10$^{-8}$ m but not more than 2×10$^{-4}$ m, preferably not less than 1×10$^{-8}$ m but not more than 2×10$^{-6}$ m, more preferably not less than 1×10$^{-8}$ m but not more than 5×10$^{-7}$ m and with a dispersion liquid in which the fine particles for image display have been dispersed (suspended).

An electrophoretic dispersion liquid according to the fourth embodiment of the present invention for achieving the object is an electrophoretic dispersion liquid sealed between two opposing substrates for displaying images and containing fine particles for image display containing porous carbon materials having an absolute value of a zeta potential of not less than 10 mV but not more than 200 mV and with a dispersion liquid in which the fine particles for image display have been dispersed (suspended).

An image display device according to the first embodiment of the present invention for achieving the object is an image display device having an electrophoretic dispersion liquid sealed between two opposing substrates, wherein the electrophoretic dispersion liquid contains fine particles for image display containing porous carbon materials which have specific surface area determined by the nitrogen BET method of not less than 100 m$^2$/g, preferably not less than 400 m$^2$/g and pore volume determined by the MP method of not less than 0.1 cm$^3$/g, preferably not less than 0.2 cm$^3$/g, more preferably not less than 0.3 cm$^3$/g and with a dispersion liquid in which the fine particles for image display have been dispersed (suspended).

An image display device according to the second embodiment of the present invention for achieving the object is an image display device having an electrophoretic dispersion liquid sealed between two opposing substrates, wherein the electrophoretic dispersion liquid contains fine particles for image display containing porous carbon materials which have specific surface area determined by the nitrogen BET method of not less than 100 m$^2$/g, preferably not less than 400 m$^2$/g and at least one peak at not more than 10 nm in pore size distribution obtained by the non-localized density functional theory method and with a dispersion liquid in which the fine particles for image display have been dispersed (suspended).

An image display device according to the third embodiment of the present invention for achieving the object is an image display device having an electrophoretic dispersion liquid sealed between two opposing substrates, wherein the electrophoretic dispersion liquid contains fine particles for image display containing porous carbon materials which have specific surface area determined by the nitrogen BET method of not less than 100 m$^2$/g, preferably not less than 400 m$^2$/g and average particle diameter of not less than 1×10$^{-8}$ m but not more than 2×10$^{-4}$ m, preferably not less than 1×10$^{-8}$ m but not more than 2×10$^{-6}$ m, more preferably not less than 1×10$^{-8}$ m but not more than 5×10$^{-7}$ m and with a dispersion liquid in which the fine particles for image display have been dispersed (suspended).

An image display device according to the fourth embodiment of the present invention for achieving the object is an image display device having an electrophoretic dispersion liquid sealed between two opposing substrates, wherein the electrophoretic dispersion liquid contains fine particles for image display containing porous carbon materials which have an absolute value of a zeta potential of not less than 10 mV but not more than 200 mV and with a dispersion liquid in which fine particles for displaying images are dispersed (suspended).

Effects of the Invention

Fine particles for image display in the present invention have values of specific surface area determined by the nitrogen BET method of not less than 100 m$^2$/g and pore volume determined by the MP method of not less than 0.1 cm$^3$/g. Alternatively, values of specific surface area determined by the nitrogen BET method and pore size distribution obtained by the non-localized density functional theory method are also defined or values of specific surface area determined by the nitrogen BET method and average particle size are also defined or values of a zeta potential are also defined. Therefore, affinity of fine particles for image display to a dispersion liquid (dispersion medium) is increased and it is considered that compatibility thereof with a dispersion liquid (dispersion medium) is increased since a specific gravity of fine particles for image display becomes the same or almost the same as that of a dispersion liquid (dispersion medium). These results can provide a better opportunity in improving dispersity of fine particles for image display into an electrophoretic dispersion liquid yielding fine particles for image display with excellent properties as a black pigment for displaying images in black as well as achieve improvement of reliability and increase of an image response in an image display device since a chance for agglomeration of fine particles for image display in a electrophoretic dispersion liquid during a long-term storage or usage can be reduced.

In a method for producing fine particles for image display according to the first and second embodiments in the present invention, when plant-based materials are carbonized to convert to a precursor for porous carbon materials or carbonaceous substances, carbonization in a temperature range between 500° C. and 1,400° C. results in, for example, no conversion of silicon contained in the plant-based materials to silicon carbide (SiC), but to silicon components (silicon oxides) including silicon dioxide ($SiO_x$), silicon oxide, and salts of silicon oxide. Therefore, treatment with an acid or alkali (base) in subsequent steps can remove silicon components (silicon oxides) including silicon dioxide, silicon oxide, and salts of silicon oxide thereby yielding large specific surface area determined by the nitrogen BET method.

MODE FOR CARRYING OUT THE INVENTION

Figure 1:
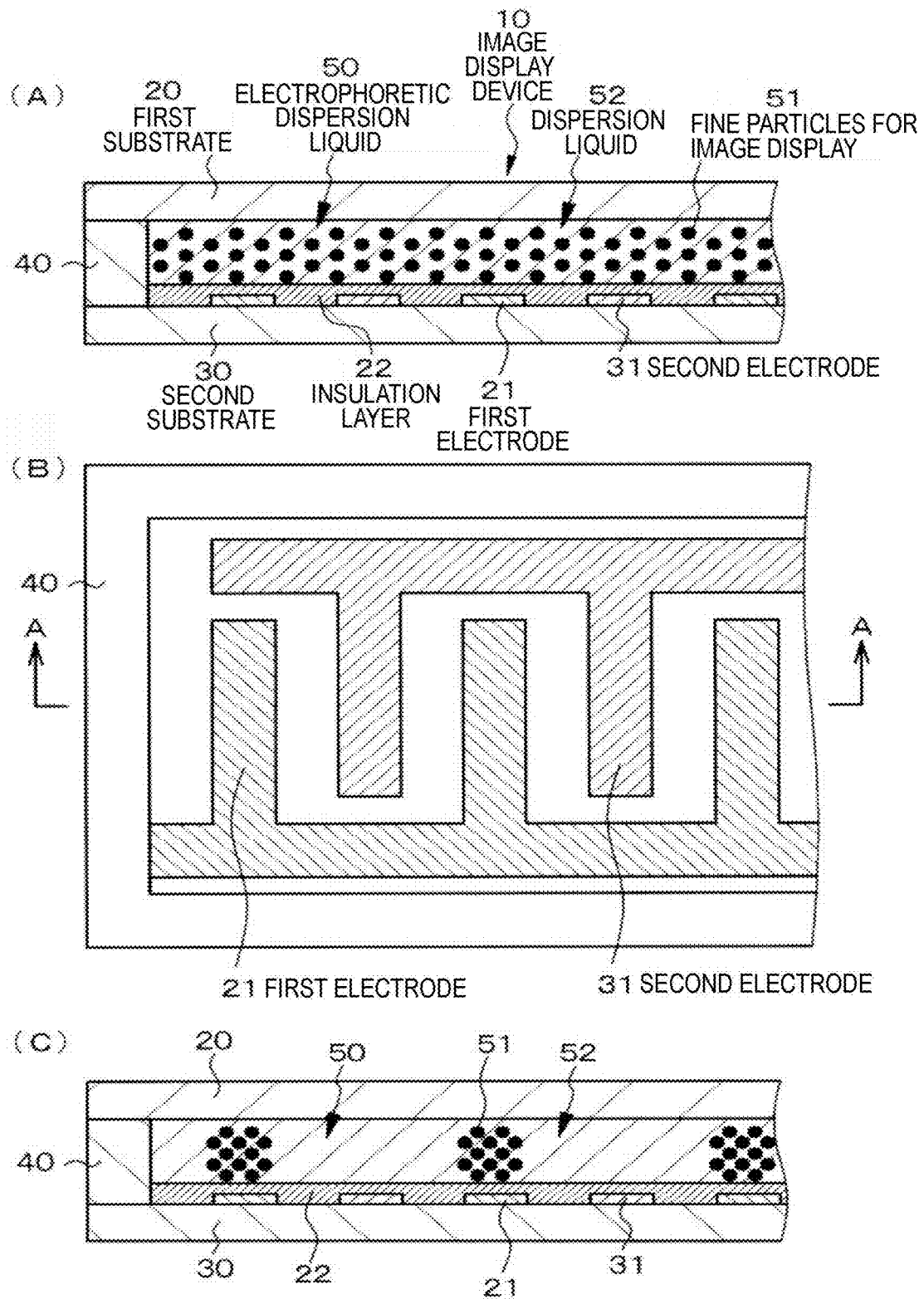
FIGS. 1(A), 1(B), and 1(C) are fragmentary schematic sectional views of an image display device and a fragmentary schematic top view of electrodes in Example 1.

Hereinafter, the present invention will be described on the basis of examples with reference to drawings, but it should not be limited only to the examples and various values and materials in examples are only for illustration. Description will be provided in the following order.

1. Description of general aspect of fine particles for image display according to the first to fourth embodiments of the present invention, a method for producing fine particles for image display according to the first and second embodiments of the present invention, an electrophoretic dispersion liquid according to the first to fourth embodiments of the present invention, and an image display device according to the first to fourth embodiments of the present invention.
2. Example 1 (fine particles for image display according to the first to fourth embodiments of the present invention, a method for producing fine particles for image display according to the first and second embodiments of the present invention, an electrophoretic dispersion liquid according to the first to fourth embodiments of the present invention, and an image display device according to the first to fourth embodiments of the present invention).
3. Example 2 (Modification of the image display device in Example 1).
4. Example 3 (Modification of the fine particles for image display, the method for producing fine particles for image display, and the electrophoretic dispersion liquid in Example 1).
5. Example 4 (Different modification of the fine particles for image display, the method for producing fine particles for image display, and the electrophoretic dispersion liquid in Example 1), and others.

[Description of general aspect of fine particles for image display according to the first to fourth embodiments of the present invention, a method for producing fine particles for image display according to the first and second embodiments of the present invention, an electrophoretic dispersion liquid according to the first to fourth embodiments of the present invention, and an image display device according to the first to fourth embodiments of the present invention]

In the fine particles for image display according to the first to fourth embodiments of the present invention (in some cases the fine particles for image display according to the first to fourth embodiments of the present invention are hereinafter referred to simply as "fine particles for image display of the present invention"), the method for producing fine particles for image display according to the first and second embodiments of the present invention (in some cases hereinafter the method for producing fine particles for image display according to the first and second embodiments of the present invention are referred to simply as a "method for producing finer particles for image display of the present invention"), the electrophoretic dispersion liquid according to the first to fourth embodiments of the present invention (in some cases hereinafter the electrophoretic dispersion liquid according to the first to fourth embodiments of the present invention is referred to simply as an "electrophoretic dispersion liquid of the present invention") or the image display device according to the first to fourth embodiments of the present invention (in some cases hereinafter the image display according to the first to fourth embodiments of the present invention is referred to simply as an "image display device of the present invention"), the fine particles for image display can be in a form derived from plant-based materials as the raw material, more specifically, for example, as the raw material in a form of plant-based materials in which content by percent of silicon (Si) is not less than 5% by mass. Furthermore, in fine particles for image display of the present invention containing a preferred form, a method for producing fine particles for image display of the present invention, an electrophoretic dispersion liquid of the present invention or an image display device of the present invention, the fine particles for image display can take a form subjected to surface modification treatment. The fine particles for image display of the present invention, those in the method for producing fine particles of the present invention, those in the electrophoretic dispersion liquid of the present invention or those in the image display device of the present invention are in some cases hereinafter referred to as "fine particles for image display in the present invention".

In the method for producing fine particles for image display of the present invention containing a preferred form, a precursor for porous carbon materials or carbonaceous substances can take a form in which activation treatment is performed after carbonization. In the method for producing fine particles for image display containing a preferred form, a precursor for porous carbon materials or carbonaceous substances can also take a form in which treatment with an acid or alkali is performed. When activation treatment is performed, treatment with an acid or alkali can be before or after activation treatment. Treatment with an acid or alkali can generate a form in which, for example, silicon components in plant-based materials after carbonization are removed. As silicon components herein, silicon oxides including silicon dioxide, silicon oxide, and salts of silicon oxide can be mentioned. Removal of silicon components in plant-based materials after carbonization in this way can yield porous carbon materials having high specific surface area. In some cases silicon components in plant-based materials after carbonization can be removed on the basis of a dry etching method. Furthermore, in a method for producing fine particles for image display containing a preferred form, content by percentage of silicon (Si) in plant-based materials can be not less than 5% by mass.

Alternatively, in the fine particles for image display according to the first embodiment of the present invention, the method for producing fine particles for image display according to the first embodiment of the present invention, the electrophoretic dispersion liquid according to the first embodiment of the present invention or the image display device according to the first embodiment of the present invention, content by percent of silicon in porous carbon materials is not more than 5% by mass, preferably not more than 3% by mass, more preferably not more than 1% by mass. Pore volume determined by the BJH method and MP method is preferably not less than 0.2 cm$^3$/g.

In fine particles for image display of the present invention containing various types of preferred forms described above, a method for producing fine particles for image display of the present invention, an electrophoretic dispersion liquid of the present invention or an image display device of the present invention (hereinafter these are collectively referred to simply as the "present invention"), preferably content by percent of magnesium (Mg) in fine particles for image display is not less than 0.01% by mass but not more than 3% by mass, content by percent of potassium (K) is not less than 0.01% by mass but not more than 3% by mass, and content by percent of calcium (Ca) is not less than 0.05% by mass but not more than 3% by mass, while not limited to these values.

"Carbonization" in the method for producing fine particles for image display of the present invention generally refers to heat treatment of organic substances (in the present invention, plant-based materials) to convert to carbonaceous substances (for example, refer to JIS M0104-1984). As the atmosphere for carbonization, the atmosphere cut off from oxygen can be mentioned, and specifically, vacuum atmosphere, inert gas atmosphere including nitrogen gas and argon gas, and atmosphere to place plant-based materials in sort of braising state can be mentioned. A temperature elevation rate to a carbonization temperature is not limited to, but under such atmospheres not less than 1° C./min, preferably not less than 3° C./min, more preferably not less than 5° C./min. As an upper limit of the carbonization time, 10 hours, preferably 7 hours, more preferably 5 hours can be mentioned, but it is not limited to these values. A lower limit of the carbonization time is a time to assure carbonization of plant-based materials. Plant-based materials can be pulverized as needed to desired particle size or classified. Plant-based materials can be cleaned in advance. Alternatively, a precursor for porous carbon materials or porous carbon materials obtained can be pulverized to desired particle size as needed and classified. Porous carbon materials after activation treatment can be pulverized to desired particle size as needed and classified. Types, constitution, and structures of furnaces used for carbonization are not limited, but continuously-operated furnaces or batch-operated furnaces can be used.

In the method for producing fine particles for image display of the present invention containing a preferred form, fine particles for image display can be converted to a form matching activation treatment before or after treatment with an acid or alkali, thereby increasing the number of micropores with pore size smaller than 2 nm (described below). As a method of activation treatment, a gas activation method and a chemical activation method can be mentioned. A gas activation method herein is a method in which using oxygen, steam, carbon dioxide or air as the activator, porous carbon materials are heated under such gas atmospheres for tens of minutes to a few hours at 700° C. to 1,400° C., preferably 700° C. to 1,000° C., more preferably 800° C. to 950° C., developing fine structures by volatile components and carbon molecules in porous carbon materials. A heating temperature can also appropriately be selected on the basis of the type of plant-based materials and the type and concentration of gases. A chemical activation method is a method in which carbon materials are activated using zinc chloride, iron chloride, calcium phosphate, calcium hydroxide, magnesium carbonate, potassium carbonate or sulfuric acid instead of oxygen or steam used in a gas activation method, followed by washing with hydrochloric acid and adjusting pH with an aqueous alkaline solution to dry.

Furthermore, in a method for producing fine particles for image display of the present invention containing the various preferred forms described above, plant-based materials can be, before carbonization, heat-treated at lower temperature than the carbonization temperature (for example, from 400° C. to 700° C.) in a state to cut off oxygen (preliminary carbonization treatment) depending on plant-based materials used. This treatment can extract tar components which would be potentially formed in carbonization process, making it possible to reduce or remove tar components, which would be potentially formed in carbonization process. A state to cut off oxygen can be created, for example, by using the inert gas atmosphere including nitrogen gas or argon gas or using a vacuum atmosphere or placing plant-based materials in sort of braising state. Alternatively, depending on the types of plant-based materials, they can be, before carbonization, immersed in alcohols (for example, methyl alcohol, ethyl alcohol, and isopropyl alcohol) in order to reduce mineral components or water contained in the plant-based materials or in order to prevent generation of stench in carbonization process. Thereinafter preliminary carbonization treatment can be performed. As materials preferably heat-treated under inert gas, for example, plants which generate a large amount of wood vinegar (tar and light oil components) can be mentioned. As materials preferably pretreated with alcohols, for example, seaweeds containing a large amount of iodine and various minerals can be mentioned.

As plant-based materials in the present invention, husks and straws of rice, barley, wheat, rye, Japanese millet, and foxtail millet, coffee beans, tea leaves (for example, leaves of green tea and black tea), sugarcanes (more specifically, bagasse), corns (more specifically, core of maizes), skin of fruits (for example, skin of orange and banana), reeds or wakame stem can be mentioned but not limited to these, and additionally, for example, vascular plants vegetated on land, pteridophyte, bryophyte, algae, and seaweed can be mentioned. As the raw material, these materials can also be used singly or multiple types of them can be mixed to use. A shape or form of plant-based materials is not particularly limited, for examples, husks and straws can be used as it is or dried products can be used. Furthermore, residual materials after various types of processing including fermentation process, roasting process, and extraction process for refreshments including beer or liqueur can be used. In particular, use of straws and husks after processing including threshing is preferred from a viewpoint of recycling industrial wastes. Such straws and husks after processing can be readily available in large quantities, for example, from agriculture cooperatives, liqueur manufacture companies, food companies, and food processing companies.

Fine particles for image display may contain nonmetal elements including phosphorous (P) or sulfur (S) and metal elements including transition metal elements. Content by percent of phosphorus (P) can be not less than 0.01% by mass but not more than 3% by mass, whereas content by percent of sulfur (S) can be not less than 0.01% by mass but not more than 3% by mass. Contents by percent of these elements, magnesium (Mg), potassium (K), and calcium (Ca) described above are varied with required properties for fine particles for image display, but preferably low from a viewpoint of increasing specific surface area. Fine particles for image display may contain elements other than those described above and it is needless to say that a range of content by percent of various elements described above can be changed according to required properties for fine particles for image display. In the present invention analysis of various elements can be performed, for example, by energy dispersive spectroscopy (EDS) using an energy dispersive X-ray spectrometer (for example, JED-2200F manufactured by JOEL, Inc.). Measurement conditions herein are, for example, set at accelerating voltage of 15 kV and beam current of 13 μA.

As surface modification treatment of fine particles for image display in the present invention, chemical treatment or molecular modification can be mentioned. As chemical treatment, for example, treatment with nitric acid or peroxodisulfate salts to form carboxyl groups on the surface can be mentioned. Treatment similar to activation treatment with steam, oxygen or alkali can also form various functional groups including hydroxyl groups, carboxyl groups, ketone groups, and ester groups on the surface of fine particles for image display. As molecular modification, surface modification of fine particles for image display with molecules having not less than three types of elements including C, N, O, S, and P through covalent bonds or ionic bonds can be mentioned. Specifically, a method for modifying the surface of fine particles for image display by covering with silica which is bonded by use of a silane coupling agent through a Si—O bond, a method through an N═N bond, and a method for modifying with ester bonds or amide bonds can be mentioned. After the surface is chemically treated, molecular modification can be performed. The larger the molecular weight of molecules to be modified, the higher the steric hindrance, improving the dispersity. Modification with molecules having positive charges including amino groups can also increase the amount of positive charges retained on fine particles for image display. On the other hand, modification with molecules having negative charges including hydroxyl groups, carboxyl groups, ketone groups, and ester groups can increase the amount of negative charges on fine particles for image display.

Fine particles for image display in the present invention have a large number of pores. Pores include "mesopores" with pore size of 2 nm to 50 nm and "micropores" with pore size less than 2 nm. Specifically, fine particles for image display contain as a mesopore, for example, a large number of pores with pore size of not more than 20 nm, particularly a large number of pores with pore size of not more than 10 nm. They also contain as a micropore, for example, pores with pore size of about 1.9 nm, those with pore size of about 1.5 nm, and those with pore size in a range of 0.8 nm to 1 nm. In fine particles for image display in the present invention, pore volume, for example, determined by the BJH method and MP method is preferably not less than 0.2 cm$^3$/g, more preferably not less than 0.3 cm$^3$/g. In fine particles for image display in the present invention, values of specific surface area determined by the nitrogen BET method (hereinafter in some cases referred to as "values of specific surface area") are preferably not less than 400 m$^2$/g in order to obtain further excellent properties as described above.

The nitrogen BET method is a method in which nitrogen is adsorbed and desorbed as an adsorbed molecule to an adsorbent (herein fine particles for image display) to determine an adsorption isotherm, of which data is analyzed on the basis of the BET equation represented by the formula (1) and specific surface area and pore volume can be calculated on the basis of this method. Specifically, when values of specific surface area are determined by the nitrogen BET method, firstly nitrogen is adsorbed and desorbed as an adsorbed molecule to an adsorbent (fine particles for image display) to determine an adsorption isotherm. Using the adsorption isotherm obtained, $p/\{V_a(p_0-p)\}$ is calculated on the basis of the formula (1) or the modified formula (1') from the formula (1) and values obtained are plotted against the relative equilibrium pressure ($p/p_0$). Plots are approximated to a straight line, of which the slope s ($=[(C-1)/(C \cdot V_m)]$) and the slope intercept i ($=[1/(C \cdot V_m)]$) are calculated on the basis of the least square method. $V_m$ and C are calculated on the basis of the formulas (2-1) and (2-2) using the slope s and the slope intercept i obtained. Furthermore, specific surface area $a_{sBET}$ is calculated on the basis of the formula (3) using $V_m$. (refer to a manual of BELSORP-mini and BELSORP analysis software made by Bel Japan, Inc., pp. 62-66). The nitrogen BET method is a measurement method pursuant to JIS R1626-1996 of "Measuring methods for the specific surface area of fine ceramic powder by gas adsorption using the BET method".

$$V_a = (V_m \cdot C \cdot p)/[(p_0-p)\{1+(C-1)(p/p_0)\}] \quad (1)$$

$$[p/(V_a(p_0-p))] = [(C-1)/(C \cdot V_m)](p/p_0) + [1/(C \cdot V_m)] \quad (1')$$

$$V_m = 1/(s+i) \quad (2\text{-}1)$$

$$C = (s/i) + 1 \quad (2\text{-}2)$$

$$a_{sBET} = (V_m \cdot L \cdot \sigma)/22414 \quad (3)$$

In these formulas, $V_a$ is the amount adsorbed $V_m$ is the amount adsorbed to a monomolecular layer, p is the pressure of nitrogen at equilibrium, $p_0$ is the saturated vapor pressure of nitrogen, L is an Avogadro's number, and σ is the cross-sectional area of adsorbed nitrogen, respectively.

When pore volume $V_p$, is calculated by the nitrogen BET method, for example, linear interpolation is applied to adsorption data used of an adsorption isotherm obtained estimating the amount adsorbed V, at a relative pressure which is set for estimation of pore volume. Pore volume $V_p$, can be calculated from the amount adsorbed V, on the basis of the formula (4) (refer to a manual of BELSORP-mini and BELSORP analysis software made by Bel Japan, Inc., pp. 62-65). Pore volume determined by the nitrogen BET method is hereinafter in some cases referred to simply as "pore volume".

$$V_p = (V/22414) \times (M_g/\sigma_g) \quad (4)$$

In this formula V is the amount adsorbed at a relative pressure, $M_g$ is a molecular weight of nitrogen, and $\sigma_g$ is a density of nitrogen.

Pore size of mesopores can be calculated, for example, on the basis of the BJH method, as pore size distribution from the rate of change of pore volume with respect to pore size. The BJH method is a method widely used for pore size distribution analysis. When pore size distribution is analyzed on the basis of the BJH method, firstly an adsorption-desorption curve is determined by adsorption-desorption of nitrogen as an adsorbed molecule to an adsorbent (fine particles for image display). On the basis of an adsorption-desorption curve obtained, thickness of an adsorbed layer when adsorbed molecules (for example, nitrogen) in a state of filling up pores are desorbed stepwise and an inner diameter of pore (two times a core radius) formed thereupon are estimated to calculate pore radius $r_p$, on the basis of the formula (5) and to calculate pore volume on the basis of the formula (6). From a pore radius and a pore volume, the rate of change in pore volume ($dV_p/dr_p$) is plotted against pore size ($2r_p$) to yield a pore size distribution curve (refer to a manual of BELSORP-mini and BELSORP analysis software made by Bel Japan, Inc., pp. 85-88).

$$r_p = t + r_k \quad (5)$$

$$V_{pn} = R_n \cdot dV_n - R_n \cdot dt_n \cdot c \cdot \Sigma A_{pj} \quad (6)$$

However, $$R_n = r_{pn}^2 / (r_{kn}-1+dt_n)^2 \quad (7)$$

In these formulas, $r_p$ is pore radius, $r_k$ is the core radius (inner diameter/2) in the case where an adsorption layer with thickness t is formed at pressure on an inner wall of the pore with pore radius $r_p$, $V_{pn}$ is pore volume at the time when n-th desorption of nitrogen occurs, $dV_n$ is the amount of volume change at the time, $dt_n$ is the amount of change in thickness of adsorbed layer $t_n$, at the time when n-th desorption of nitrogen occurs, $r_{kn}$ is a core radius at the time, c is a fixed value, and $r_{pn}$ is pore radius at the time when n-th desorption of nitrogen occurs. $\Sigma A_{pj}$ is also an integrated value of the wall surface area of pores from j=1 to j=n−1

Pore size of micropores can be calculated, for example, on the basis of the MP method, as pore size distribution from the rate of change of pore volume with respect to pore size. When pore size distribution is analyzed on the basis of the MP method, firstly an adsorption-desorption curve is determined by adsorption-desorption of nitrogen as an adsorbed molecule to an adsorbent (fine particles for image display). The adsorption isotherm is converted to pore volume against thickness of adsorbed layer t (plotted against t). A pore size distribution curve can be obtained on the basis of a curvature of the plots (the amount of change of pore volume against the amount of change of adsorbed layer thickness t) (refer to a manual of BELSORP-mini and BELSORP analysis software made by Bel Japan, Inc., pp. 72-73 and 82).

In application of the non-localized density functional theory method (NLDFT method) defined by JIS Z8831-2: 2010 of "Pore size distribution and porosity of powder (solid materials)—Part 2: Analysis of mesopores and macropores by gas adsorption" and JIS Z8831-3:2010 of "Pore size distribution and porosity of powder (solid materials)—Part 3: Analysis of micropores by gas adsorption", software attached to an automatic specific surface area/pore size distribution analyzer, BELSORP-MAX made by Bel Japan Inc. is used. As a prerequisite, a cylindrical pore model is assumed for carbon black (CB) and "no-assumption" is made about a distribution function of pore size distribution parameters, and distribution curve data obtained are smoothed 10 times.

When a precursor for porous carbon materials is treated with an acid or alkali, as the specific treatment method, for example, a method in which a precursor for porous carbon materials is immersed in an aqueous acid or alkali solution and a method in which a precursor for porous carbon materials is reacted in gas phase with an acid or alkali can be mentioned. More specifically, when treated with an acid, as the acid, for example, acidic fluorine compounds including hydrogen fluoride, hydrofluoric acid, ammonium fluoride, calcium fluoride, and sodium fluoride can be mentioned. When fluorine compounds are used, the amount of fluorine element is adjusted to 4 times the amount of silicon element as silicon components contained in a precursor for porous carbon materials and concentration of an aqueous solution of fluorine compounds is preferably not less than 10% by mass. When silicon components (for example, silicon dioxide) contained in a precursor for porous carbon materials are removed by treatment with hydrofluoric acid, silicon dioxide is reacted with hydrofluoric acid as shown in the chemical formula (A) or chemical formula (B), and removed as hexafluorosilicic acid ($H_2SiF_6$) or silicon tetrafluoride ($SiF_4$), yielding fine particles for image display. The products are then washed and dried.

$$SiO_2 + 6HF \rightarrow H_2SiF_6 + 2H_2O \tag{A}$$

$$SiO_2 + 4HF \rightarrow SiF_4 + 2H_2O \tag{B}$$

When treated with an alkali (base), as the alkali, for example, sodium hydroxide can be mentioned. When an aqueous solution of alkali is used, pH of the aqueous solution is not less than 11. When silicon components (for example, silicon dioxide) contained in a precursor for porous carbon materials are removed by treatment with an aqueous solution of sodium hydroxide, an aqueous solution of sodium hydroxide is heated to react with silicon dioxide as shown in the chemical formula (C), and removed as sodium silicate ($Na_2SiO_3$), yielding fine particles for image display. When treated by reacting with sodium hydroxide in gas phase, sodium hydroxide solids are heated to react as shown in the chemical formula (C) to be removed as sodium silicate ($Na_2SiO_3$), yielding fine particles for image display. The products are then washed and dried.

$$SiO_2 + 2NaOH \rightarrow Na_2SiO_3 + H_2O \tag{C}$$

Among two opposing substrates, a substrate placed nearer to the side of an image viewer is referred to as, for convenience, a "second substrate", a substrate facing the second substrate is referred to as, for convenience, a "first substrate", an electrode disposed on the first substrate as needed is referred to as, for convenience, a "first electrode", and an electrode disposed on the second substrate as needed is referred to as, for convenience, a "second electrode". As the second substrate herein, insulation members including transparent glass substrates and plastic substrates can be mentioned. A first substrate can be constituted with any insulation member and, for example, glass substrates and plastic substrates can be mentioned. Specifically, transparent inorganic substrates including quartz, sapphire, and glass and transparent plastic substrates including polyethylene terephthalate, polyethylene naphthalate, polycarbonate, polyethersulfone, polystyrene, polyethylene, polypropylene, polyphenylene sulfide, polyvinylidene fluoride, tetraacetyl cellulose, brominated phenoxy resins, aramids, polyimides, polystyrenes, polyarylates, polysulfones, and polyolefins can be mentioned. As the thickness of substrates, a range from 2 μm to 5 mm, preferably 5 μm to 1 mm can be exemplified. If substrates are too thin, strength thereof is insufficient and uniformity of distance between substrates becomes difficult to maintain. On the other hand, if substrates are too thick, sharpness and contrast of images as function of a display are decreased, particularly causing lack of flexibility in application to e-paper.

When an electrode is not disposed on substrates, electrostatic latent images are developed on the outer surface of a substrate to attract fine particles for image display toward the substrate or repulse from the substrate by an electric field generated in response to the electrostatic latent image, thereby allowing for visualization through the second transparent substrate of fine particles for image display aligned in response to the electrostatic latent image. A method for forming electrostatic latent images performed in a common electrophotographic system using an electron photoreceptor can be applied to form electrostatic latent images. Alternatively, electrostatic latent images may be directly formed on a substrate by controlling an ion flow. On the other hand, when an electrode is disposed on a substrate, charged fine particles for image display with desired properties are attracted toward the electrode or repulsed from the electrode in response to the electric field generated by applying a direct current or indirect current to electrodes, thereby allowing for visualization of fine particles for image display through the second transparent substrate. A switching device (for example, thin film transistor (TFT)) is preferably disposed on the first substrate in order to control a voltage applied to electrodes.

As a second electrode, so-called transparent electrodes can be mentioned, specifically, indium-tin complex oxides (including ITO, indium tin oxide, Sn-doped $In_2O_3$, crystalline ITO, and amorphous ITO), fluorine-doped $SnO_2$ (FTO), IFO (F-doped $In_2O_3$), antimony-doped $SnO_2$ (ATO), $SnO_2$, ZnO (including Al-doped ZnO and B-doped ZnO), indium-zinc complex oxides (IZO, indium zinc oxide), spinel-type oxides, oxides having a $YbFe_2O_4$ structure, and electroconductive polymers including polyaniline, polypyrrole, and polythiophene can be mentioned, but transparent electrodes are not limited to those and two or more types of these materials can be used in combination. The first electrode can be constituted not only with transparent materials but also with metals including gold, silver, copper, and aluminum or alloys as well as constituted with a layer of black electrode materials (specifically, for example, titanium carbide layer, blackened chromium layer, aluminum layer of which a black layer is formed on the surface, and black titanium layer). Electrodes can be formed on the basis of physical vapor deposition methods (PVD method) including vacuum deposition methods and sputtering methods, various chemical vapor deposition methods (CVD method), and various coating methods. Patterning of electrodes can be performed by any method including etching methods, liftoff techniques, and methods using various masks.

An insulation layer is formed on an electrode as needed. As materials for constituting such an insulation layer, for example, colorless transparent insulation resins can be mentioned, specifically, for example, acrylic resins, epoxy resins, fluoro resins, silicone resins, polyimide resins, and polystyrene resins can be mentioned. Fine particles for scattering of light, for example, aluminum oxide and titanium oxide can be added to colorless transparent resins constituting an insulation layer.

In an image display device, pixels (display elements) are preferably separated by barriers. Rib-shaped barriers can be prepared, for example, by a photolithography process using photosensitive resins as well as prepared by various molding methods. A barrier can be prepared by integration with one of two substrates or by integration with each substrate followed by adhesion of barriers together or a barrier and a substrate are prepared independently followed by adhesion of the barrier to the substrate. A shape of a barrier can be appropriately selected on the basis of the size of fine particles for image display, and as the barrier width, a range of $1 \times 10^{-6}$ m to $1 \times 10^{-3}$ m, preferably $3 \times 10^{-6}$ m to $5 \times 10^{-4}$ m can be exemplified and as the barrier height, a range of $1 \times 10^{-5}$ m to 5 mm, preferably $1 \times 10^{-5}$ m to 0.5 mm can be exemplified. As the planar shape for pixels (image elements)

surrounded by barriers, a square, a triangle, a circle or a hexagon (honeycomb structure) can be exemplified as well as a line-shape can be used. A size of a pixel (display element) can be determined on the basis of required specifications for an image display device, and for example, as the length of a side, a range of $1\times10^{-5}$ m to 5 mm, preferably $3\times10^{-5}$ m to 0.5 mm can be exemplified. As the ratio of a volume of fine particles for image display occupying pixels (image elements) surrounded by a barrier relative to a total volume of pixels (image elements) surrounded by barriers to be equal to 1, a range of 0.1 to 0.8, preferably 0.1 to 0.7 can be exemplified. A method for filling an electrophoretic dispersion liquid is not particularly limited, but for example, an ink jet method can be adopted.

As the ratio of the amount of fine particles for image display to the amount of a dispersion liquid (dispersion medium) in an electrophoretic dispersion liquid, a range of 0.1 parts by mass to 15 parts by mass, preferably 1 part by mass to 10 parts by mass of fine particles for image display to 100 parts by mass of a dispersion liquid (dispersion medium) can be exemplified. As the dispersion liquid (dispersion medium) for dispersing fine particles for image display, colorless transparent liquids having high insulating properties, specifically, non-polar dispersion mediums, more specifically, aliphatic hydrocarbons, aromatic hydrocarbons, halogenated hydrocarbons, and silicone oil can be mentioned. As aliphatic hydrocarbons, pentane, hexane, cyclohexane, heptane, octane, nonane, decane, dodecane, ligroin, solvent naphtha, kerosene, normal paraffin, and isoparaffin can be mentioned. As aromatic hydrocarbons, benzene, toluene, xylene, and alkylbenzenes can be mentioned. As silicone oil, various dimethylpolysiloxanes including modified silicone oil can be mentioned. More specifically, Isopar G, Isopar H, Isopar L, Isopar M, Exxsol D30, Exxsol D40, Exxsol D80, Exxsol D110, and Exxsol D130 made by Exxon Mobil Corporation, IP Solvent 1620, IP Solvent 2028, and IP Solvent 2835 made by Idemitsu Petrochemical Company, Ltd., Shellsol 70, Shellsol 71, Shellsol 72, Shellsol A, and Shellsol AB made by Shell Chemicals Japan Ltd., and Naphthesol L, Naphthesol M, and Naphthesol H made by Nippon Petrochemical Company, Ltd. can be mentioned. They can be used singly or two or more types of them can be mixed to use. Oil soluble dyes can be used for coloring a dispersion medium and specifically, for example, yellow dyes, orange dyes, brown dyes, and red dyes composed of azo compounds and blue dyes, green dyes, and violet dyes composed of anthraquinones can be mentioned. Only one type of these dyes can be used or two or more types of dyes can be used in combination. Concentration of dyes is preferably from 0.1 parts by mass to 3.5 parts by mass to 100 parts by mass of a dispersion medium, but is not limited to this range.

A structure in which an electrophoretic dispersion liquid is sealed in a microcapsule can be adopted. Microcapsules can be obtained by a well-known method including an interfacial polymerization method, an in-situ polymerization method, and a coacervation method. Excellent light transmitting properties are required for materials constituting microcapsules and specifically, urea-formaldehyde resins, melamine-formaldehyde resins, polyester resins, polyurethane resins, polyamide resins, polyethylene resins, polystyrene resins, polyvinyl alcohol resins, gelatin or copolymers thereof can be exemplified. A method for disposing microcapsules on a substrate is not particularly limited, but for example, an ink jet method can be mentioned. Microcapsules can be fixed on a substrate using a light transmitting binder resin in order to prevent misalignment of microcapsules disposed on the substrate. As the light-transmitting binder resin, water soluble polymers, specifically, for example, polyvinyl alcohol, polyurethane, polyester, acrylic resins, and silicone resins can be mentioned.

When a positive charge control agent is used to charge fine particles for image display with a positive charge, as the positive charge control agent, for example, nigrosine dyes including Nigrosine Base EX (made by Orient Chemical Industries Co., Ltd.), quaternary ammonium salts including P-51 (made by Orient Chemical Industries Co., Ltd.) and Copy Charge PX VP435 (made by Hoechst Japan Co., Ltd.), alkoxylated amines, alkylamides, molybdic acid chelate pigments, imidazole compound including PLZ1001 (made by Shikoku Chemicals Corporation), and transparent or white onium compounds can be mentioned. As onium compounds, primary to quaternary compounds can be freely selected from ammonium compounds, sulfonium compounds, and phosphonium compounds, and for example, a substituent bonded to a nitrogen, sulfur or phosphorous atom is an alkyl group or an aryl group and as salts, halogen elements represented by chlorine, a hydroxyl group, and a carboxyl acid group are preferred as the counter ion, but not limited to these. Among them, primary to tertiary amine salts and quaternary ammonium salts are particularly preferred. When a negative charge control agent is used to charge fine particles for image display with a negative charge, as the negative charge control agent, for example, metal complexes including Bontron S-22, Bontron-S-34, Bontron E-81, and Bontron E-84 (made by Orient Chemical Industries Co., Ltd.) and Spiron Black TRH (made by Hodogaya Chemical Co., Ltd.), thioindigo pigments, quaternary ammonium salts including Copy Charge NXVP 434 (made by Hoechst Japan Co., Ltd.), calixarene compounds including Bontron E-89 (made by Orient Chemical Industries Co., Ltd.), boron compounds including LR147 (made by Japan Carlit Co., Ltd.), fluorine compounds including magnesium fluoride and fluorinated carbon, publicly known metal soaps including aluminum stearate, calcium stearate, aluminum laurate, barium laurate, sodium oleate, zirconium octate, and cobalt naphthenate, salicylic acid-type metal complexes with azine compounds, and phenol-type condensates can be mentioned.

As the electrophoretic dispersion liquid, non-ionic surfactants including sorbitan fatty acid esters (for example, sorbitan monooleate, sorbitan monolaurate, sorbitan sesqueoleate, and sorbitan trioleate), polyoxyethylene sorbitan fatty acid esters (for example, polyoxyethylene sorbitan monostearate and polyoxyethylene sorbitan monooleate), polyethylene glycol fatty acid esters (for example, polyoxyethylene monostearate and polyethylene glycol diisostearate), polyoxyethylene alkylphenyl ethers (for example, polyoxyethylene nonylphenyl ether and polyoxyethylene octylphenyl ether), and aliphatic diethanolamides can be used. As the polymeric dispersing agent, for example, styrene-maleic acid resins, styrene-acrylic resins, rosin, urethane-type polymer compounds of BYK-160, BYK-162, BYK-164, and BYK-182 (made by BYK Chemie GmbH), urethane-type dispersing agents EFKA-47 and LP-4050 (made by EFK A Company, Ltd.), polyester-type polymer compound Sorsperse 24000 (made by Zeneca Corporation), and aliphatic diethanolamide-type polymer compound Sorsperse 17000 (made by Zeneca Corporation) can be mentioned. As other polymeric dispersing agents, random copolymers with a monomer capable of forming segments which can be solvated to a dispersion medium including lauryl methacrylate, stearyl methacrylate, 2-ethylhexyl methacrylate, and cetyl methacrylate, monomers capable of forming segments which are difficult for solvation to a dispersion medium including methyl methacrylate, ethyl methacrylate, isopropyl methacrylate, styrene, and vinyltoluene, and monomers having polar functional groups, and graft copolymers disclosed in Japanese Patent Application Laid-Open H3-188469 can be mentioned. As monomers having polar functional groups, monomers having acidic functional groups including acrylic acid, methacrylic acid, itaconic acid, fumaric acid, maleic acid, and styrenesulfonic acid and monomers having basic functional groups including dimethylaminoethyl methacrylate, diethylaminoethyl methacrylate, vinylpyridine, vinylpyrrolidine, vinylpiperidine, and vinyl lactam, salts thereof, styrene-butadiene copolymers, block copolymers of styrene and long chain alkyl methacrylate disclosed in Japanese Patent Application Laid-Open 560-10263 can be mentioned. Dispersing agents of graft copolymers disclosed in Japanese Patent Application Laid-Open H3-188469 can be added. Ionic surfactants can be added in order to more effectively induce electrophoretic movement of fine particles for image display. As a specific example of anionic surfactants, sodium dodecylbenzenesulfonate, sodium dodecylsulfate, sodium alkylnaphthalenesulfonate, and sodium dialkyl sulfosuccinate can be mentioned. As a specific example of cationic surfactants, alkylbeneznedimethylammonium chloride, alkyltrimethylammonium chloride, and distearylammonium chloride can be mentioned. Ionic additives soluble in a nonpolar solvent including trifluorosulfonylimide salts, trifluoroacetate salts, and trifluorosulfate salts can be added.

In an electrophoretic dispersion liquid of the present invention, in addition to fine particles for image display containing porous carbon materials at least one type of particles different in color and charging polarities can be further dispersed (suspended) as needed.

Additionally, for example, metal reflection plates, light diffusion plates or light diffusion layers, and reflection prevention layer can be disposed and installed in an image display device of the present invention. An image display device is also provided with a drive circuit, an arithmetic circuit, an internal memory, and a power source. An image display device of the present invention does not need an orientation controlling membrane and a polarization plate as a liquid crystal display device and has a simple structure with good stability to a temperature variation enabling its use from low temperature to high temperature. Additionally, an image display device with a large area can be provided at low cost and has no dependency on view angle but images are easily viewed even in bright spots because of high reflectance and a reflection type and power consumption is low.

An image display device of the present invention can be adopted to various image display devices for so-called desk top-type personal computers, notebook-type personal computers, personal digital assists (PDA), cellular phones, game machines, e-books including electronic newspaper, bulletin boards including signs, posters, and blackboards, copy machines, rewritable paper as an alternative of printing paper, displays for calculators and appliances, displays of cards in point earning cards, electronic advertisement, and digital signage. Alternatively, it can be adapted to an electrophoretic display device, a toner display device, and a magnetic image display.

EXAMPLE 1

Example 1 relates to the fine particles for image display according to the first to fourth embodiments of the present invention, the method for producing fine particles for image display of the present invention, the electrophoretic dispersion liquid according to the first to fourth embodiments of the present invention, and the image display device according to the first to fourth embodiments of the present invention. Fragmentary schematic sectional views of the image display device of Example 1 are illustrated in FIGS. 1(A) and 1(C), and a schematic top view of electrodes is illustrated in FIG. 1(B). FIGS. 1(A) and 1(C) are fragmentary schematic sectional views in the direction of arrow A-A of FIG. 1(B).

The image display device 10 of Example 1 is an image display device having an electrophoretic dispersion liquid 50 which are sealed between two opposing substrates 20 and 30. Specifically, the second substrate 30 and the first substrate 20 on which a first electrode 21 and a second electrode 31 were disposed were disposed to face each other at a given distance through a sealing member 40. A substrate placed nearer to the side of an image viewer was the second substrate 30. Insulation layers 22 were formed on the first electrode 21 and the second electrode 31. The first electrode 21 and the second electrode 31 were constituted with so-called comb-shaped electrodes. The electrophoretic dispersion liquid (electrophoretic particle dispersion liquid) 50 was sealed between two opposing substrates 20 and 30, specifically in pixels (display elements) divided by the first substrate 20, the second substrate 30, and the sealing member 40. Herein, the electrophoretic dispersion liquid 50 was constituted at least with the fine particles for image display (electrophoretic particles) 51 and the dispersion fluid (dispersion fluid of electrophoretic particles) 52, in which fine particles for image display were dispersed (suspended). The fine particles for image display (electrophoretic particles) 51 contained porous carbon materials, which had values of specific surface area determined by the nitrogen BET method of not less than 100 $m^2/g$ and pore volume determined by the MP method of not less than 0.1 $cm^3/g$ and which contained silicon not more than 1% by mass and had pore volume determined by the BJH method and MP method of not less than 0.2 $cm^3/g$. Alternatively, the fine particles for image display (electrophoretic particles) 51 contained porous carbon materials which had values of specific surface area, determined by the nitrogen BET method, of not less than 100 $m^2/g$ and at least one peak at not more than 10 nm in pore size distribution determined by the non-localized density functional theory method. A ratio of a total volume of pores having pore size within a range of not higher than 10 nm relative to a total volume of pores having a pore size within a range of not higher than 50 nm was not less than 0.1. Alternatively, the fine particles for image display (electrophoretic particles) 51 contained porous carbon materials, which had values of specific surface area, determined by the nitrogen BET method, of not less than 100 $m^2/g$, specifically 1,080 $m^2/g$ and average particle size of not less than $1 \times 10^{-8}$ m but not more than $2 \times 10^{-4}$ m, specifically 0.5 μm. Alternatively, the fine particles for image display (electrophoretic particles) 51 contained porous carbon materials which had an absolute value of a zeta potential of not less than 10 mV but not more than 200 mV, specifically, −58.20 mV (mobility: $0.1582 \times 10^{-4}$ $cm^2/V.sec$). Average zeta potential and average particle size of the fine particles for image display (electrophoretic particles) 51 herein can be determined using ELSZ-2 made by Otsuka Electronics Co., Ltd.

In Example 1, the fine particles for image display used were plant-based materials as the raw material, specifically, as the raw material of which content by percent of silicon (Si) was not less than 5% by mass. Surface modification treatment was performed for fine particles for image display.

Surface modification treatment was, specifically, chemical treatment to generate carboxyl groups on the surface by treatment with nitric acid. Formation of carboxyl groups on the surface by treatment with nitric acid made further easier the fine particles for image display (electrophoretic particles) 51 bonding to a dispersing agent and improved dispersity of the fine particles for image display (electrophoretic particles) 51, thereby reducing a chance of agglomeration of fine particles for image display in an electrophoretic dispersion liquid during a long-term storage or usage as well as improving reliability and an image response in an image display device.

The first substrate 20 and the second substrate 30 contained soda glass with thickness of 0.7 mm. The first electrode 21 and the second electrode 31 contained transparent electrodes constituted with indium-tin complex oxide (ITO) and formed by a physical vapor deposition (PVD) method including a sputtering method in combination with a liftoff method. Furthermore, the insulation layer 22 was constituted with colorless transparent insulation resins, specifically, acrylic resins. Pixels (display elements) were constituted with the area occupied by a comb-shaped electrode. A width of a single comb-shaped electrode was 10 μm, a gap between two electrodes was 10 μm, and a distance between the first substrate 20 and the second substrate 30 was 10 μm, respectively.

In Example 1 an isoparaffin-type solvent (Isopar G made by Exxon Mobil Corporation) was used as a dispersion liquid (dispersion medium for electrophoretic particles) 52.

Plant-based materials were carbonized at temperature from 500° C. to 1,400° C. to yield porous carbon materials (a precursor for porous carbon materials or carbonaceous substances), which contained the fine particles for image display (electrophoretic particles) 51. The precursor for porous carbon materials or carbonaceous substances was then treated with an acid or alkali (acid in Example 1). Herein acid treatment removed silicon components in plant-based materials after carbonization. Content by percent of silicon (Si) in plant-based materials was not less than 5% by mass.

In Example 1, specifically, a plant-based material, a raw material for fine particles for image display, was rice husks. Fine particles for image display in Example 1 were obtained by carbonizing husks as the raw material to convert to carbonaceous substances (a precursor for porous carbon material), followed by acid treatment and nitric acid treatment. In Example 1 and Example 2 described below treatment with steam activation and treatment with nitric acid were performed after acid treatment.

In production of fine particles for image display in Example 1, firstly crushed husks (husk of rice Ishikari, product of Kagoshima Prefecture) were heat-treated under inert gas (preliminary carbonization treatment). Specifically, husks were heated at 500° C. for 5 hours under a stream of nitrogen to carbonize yielding carbides (a precursor for porous carbon materials). Then, the precursor for porous carbon materials was immersed in a 46% by volume aqueous solution of hydrofluoric acid for acid treatment and then washed with water and ethyl alcohol until pH of the solution became 7 and dried. After crushing 10 g of the carbide were placed in a crucible made from alumina and heated under a stream of nitrogen (10 L/min) at a temperature elevation rate of 5° C./min to 900° C. The carbide was treated with steam activation at 900° C. for 3 hours and then cooled to ambient temperature. At the end the carbide was dried to yield fine particles for image display in Example 1 (referred to as "fine particles for image display in Example 1A").

Treatment with nitric acid was then performed. Specifically, 1.5 g of fine particles for image display in Example 1A were added to 30 mL of concentrated nitric acid and stirred for 3 days with a stirrer. Hereinafter, a mixture of the fine particles for image display-nitric acid solution to which fine particles for image display were added was gradually added to 300 mL of water and stirred. Using a centrifuge machine, the solution was centrifuged to separate fine particles for image display from the solution. To remove residual nitric acid a work of adding water to the fine particles for image display to disperse and then centrifuging it was repeated 10 times. Furthermore, a work of adding acetone to fine particles for image display to disperse and centrifuging it was repeated 3 times, followed by drying overnight at 50° C. in a vacuum oven.

9.9 g of an Isopar G solution containing a 1& by mass dispersing agent (Solsperse 17000 made by Japan Lubrizol Corporation) were added to 0.1 g of the fine particles for image display with such nitric acid treatment (fine particles for image display in Example 1) and dispersed using a bead mill to yield an electrophoretic dispersion liquid in black. Fine particles for image display (electrophoretic particles) were negatively (minus) charged.

Figure 4:
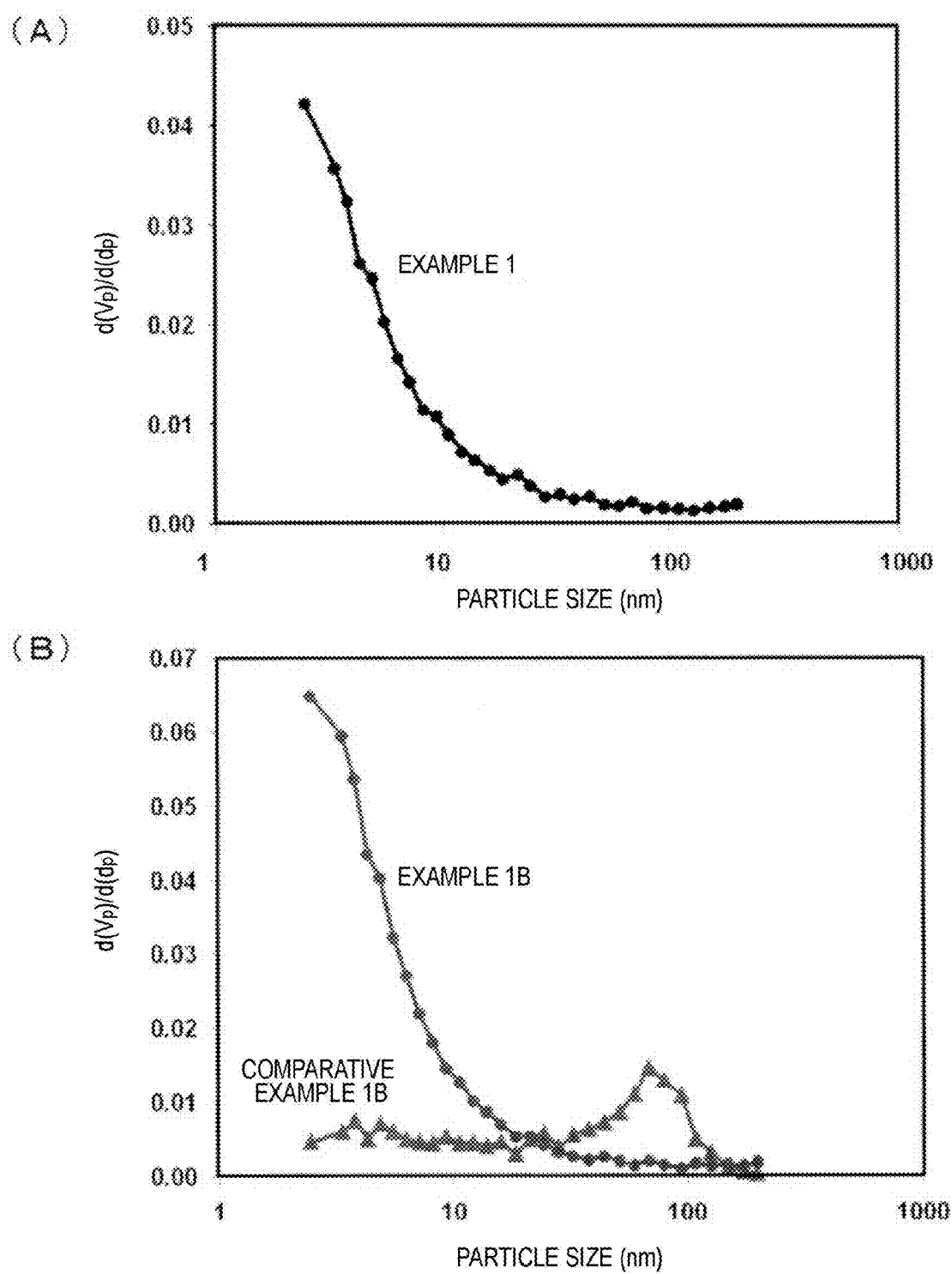
FIGS. 4(A) and 4(B) are graphs representing pore size distribution, determined on the basis of the BJH method, of fine particles for image display in Example 1, and Example 1B and Comparative Example 1B, respectively.
Figure 5:
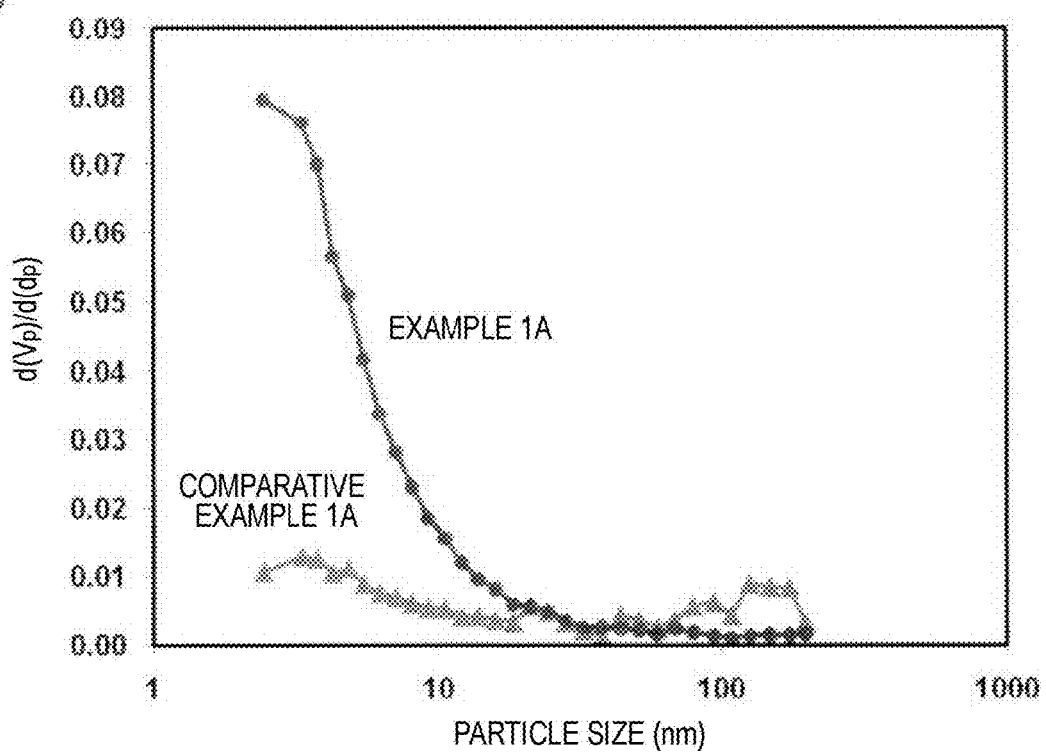
FIGS. 5(A) and 5(B) are a graph representing pore size distribution determined on the basis of the BJH method of fine particles for image display in Example 1A and Comparative Example 1A, and a graph representing pore size distribution determined on the basis of the MP method of fine particles for image display in Example 1.
Figure 5:
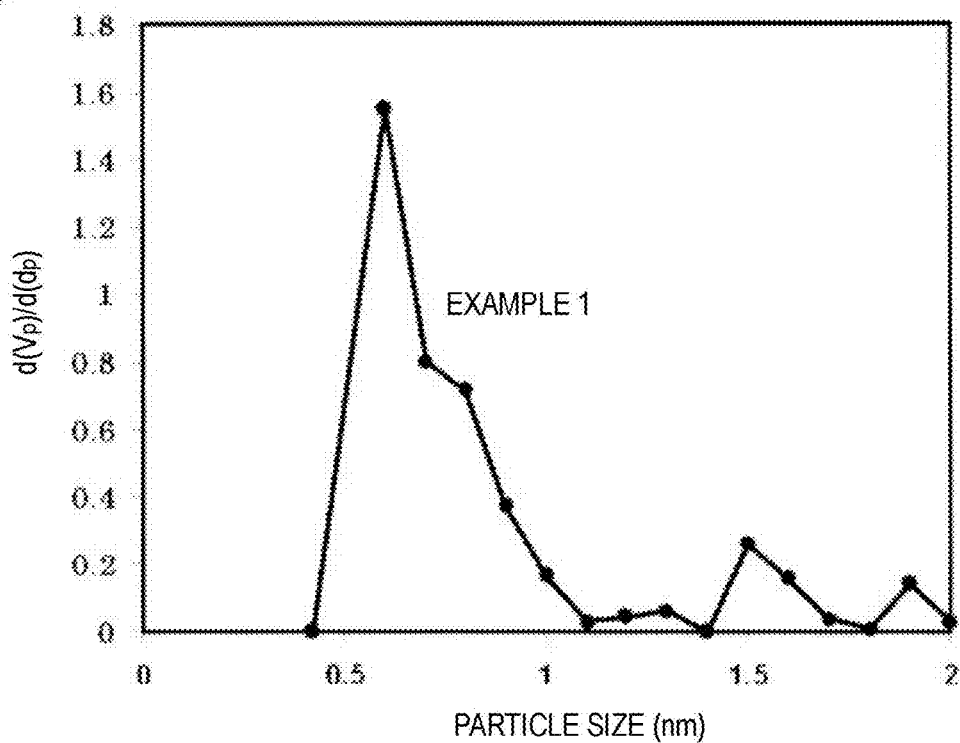
Figure 6:
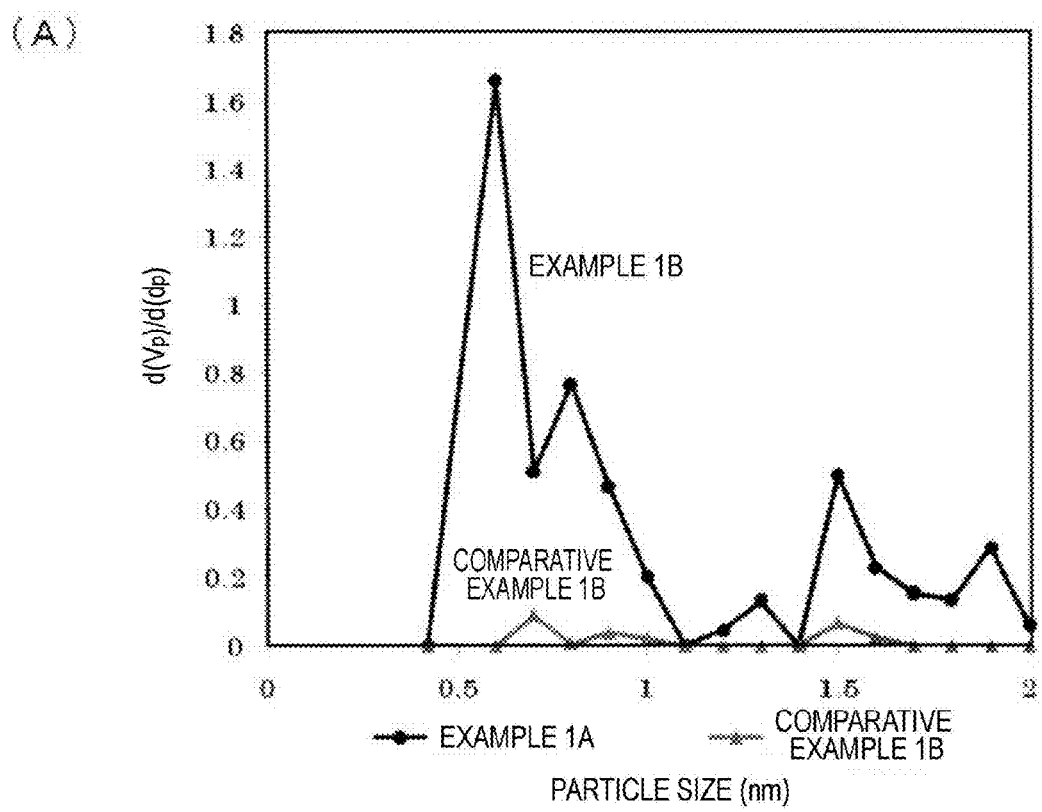
FIGS. 6(A) and 6(B) are a graph representing pore size distribution, determined on the basis of the MP method, of fine particles for image display in Example 1B and Comparative Example 1B, and a graph representing pore size distribution, determined on the basis of the MP method, of fine particles for image display in Example 1 and Comparative Example 1A.
Figure 6:
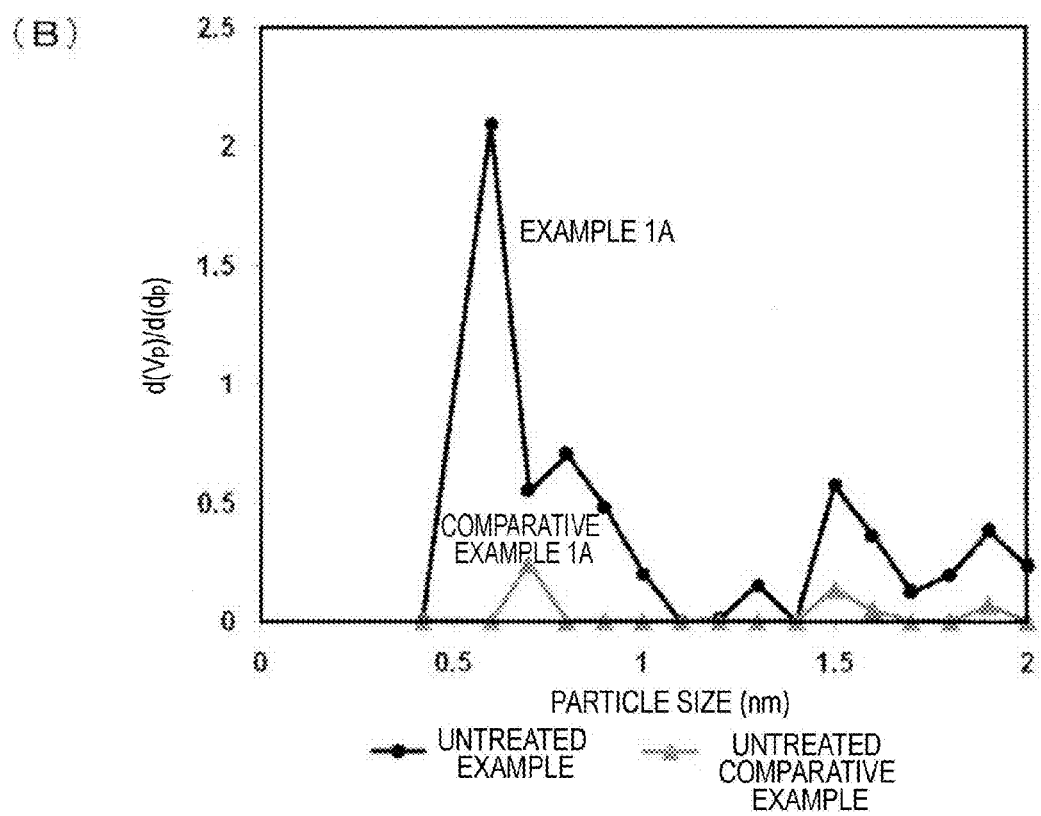
Figure 7:
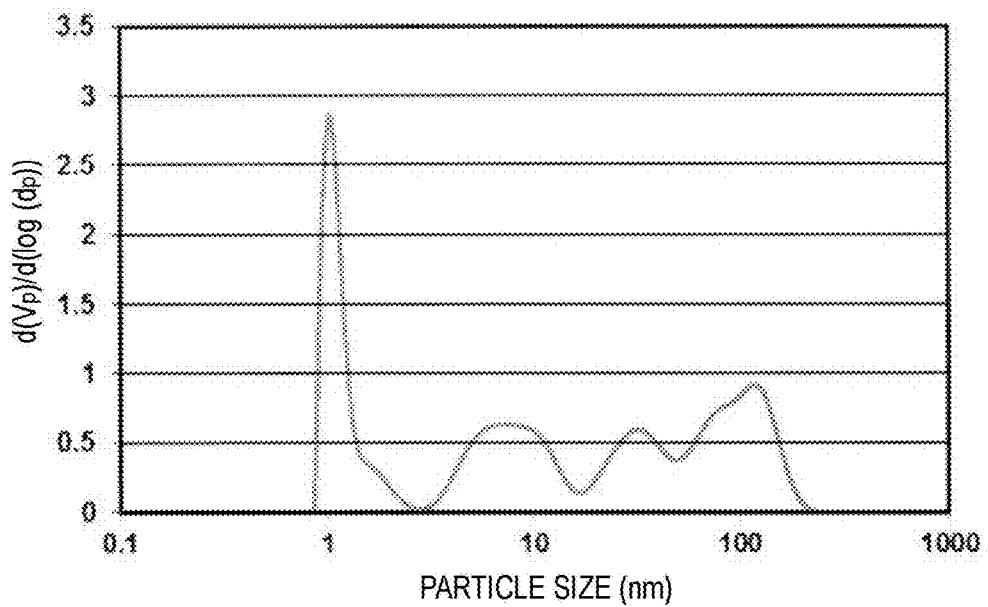
FIGS. 7(A) and 7(B) are graphs of measurement results of pore size distribution of fine particles for image display in Example 1 and Example 1B obtained by the non-localized density functional theory method, respectively.
Figure 7:
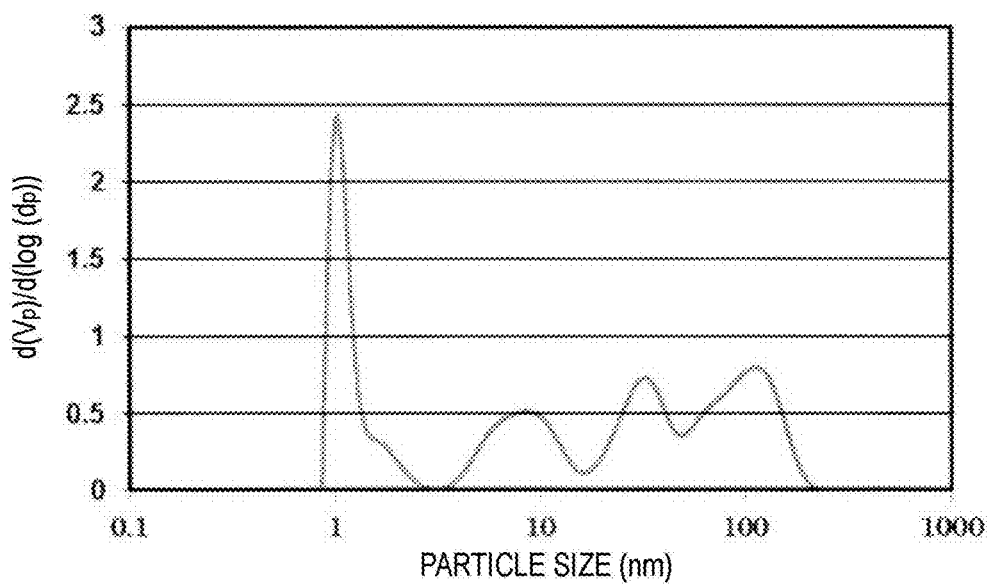
Figure 8:
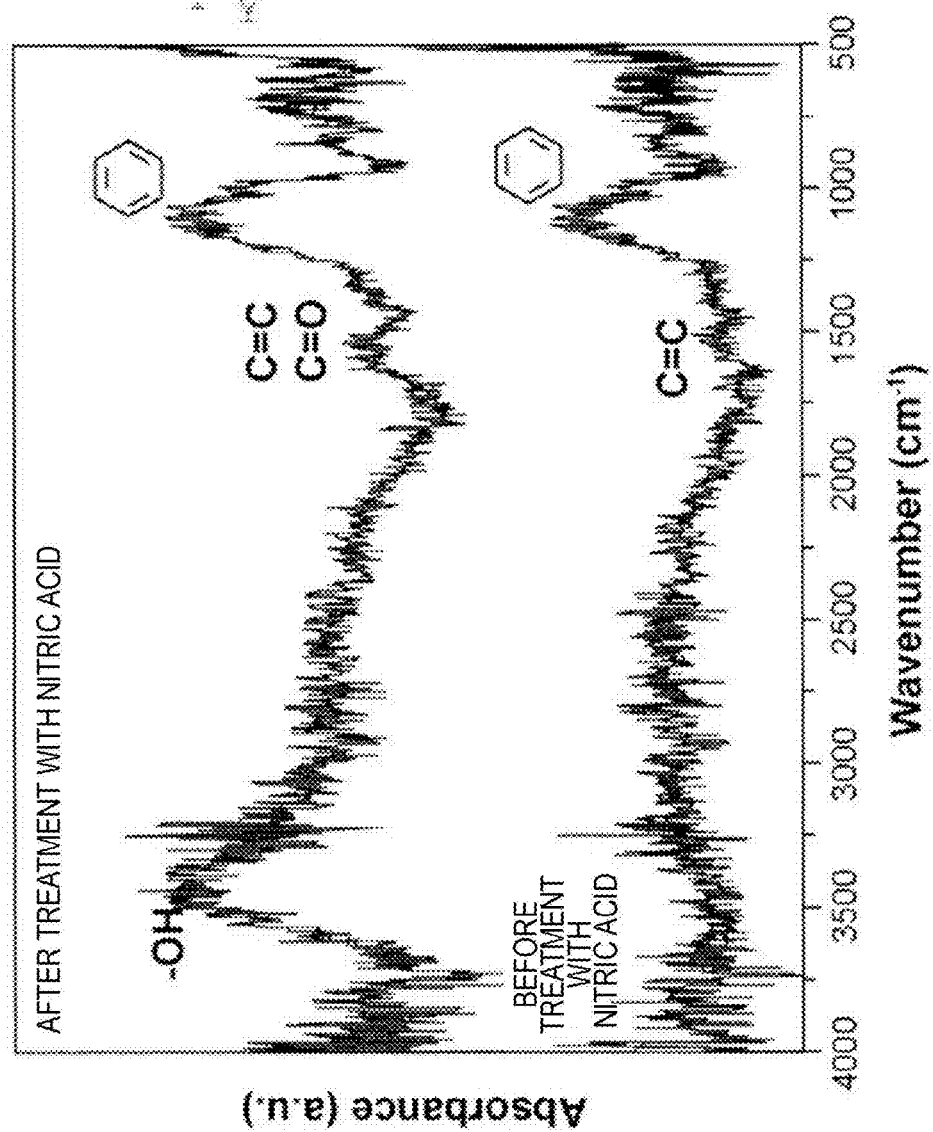
FIG. 8 is a graph representing analytical results in infrared spectra of fine particles for image display in Example 1.

When specific surface area, pore volume and pore volume determined by the MP method, and pore volume determined by the BJH method were determined for fine particles for image display in Example 1, the results shown in Table 1 were obtained. "Specific surface area" and "total pore volume" in Table 1 denote values of the specific surface area and total pore volume determined by the nitrogen BET method and units thereof are $m^2/g$ and $cm^3/g$, respectively. The "MP method" and "BJH method" in Table 1 also indicate the results of pore volume determined by the MP method and those of pore volume determined by the BJH method and the unit thereof is $cm^3/g$. In measurement with the nitrogen BET method and measurement on the basis of the non-localized density functional theory method (NLDFT method), a nitrogen gas was passed as pretreatment at a flow rate of 5 L/min at 400° C. for 1 hour to dry and remove modified molecules on the surface of fine particles for image display. Furthermore, the results of pore size distribution of mesopores and micropores of fine particles for image display determined on the basis of the BJH method and MP method in Example 1, Example 1A, and Example 1B, Comparative Example 1A, and Comparative Example 1B described below are shown in FIGS. 4(A) and 4(B), FIGS. 5(A) and 5(B), and FIGS. 6(A) and 6(B), respectively. FIGS. 4(A) and 4(B) are graphs representing pore size distribution determined on the basis of the BJH method of fine particles for image display in Example 1B and Comparative Example 1B, respectively. FIGS. 5(A) and 5(B) are also graphs representing pore size distribution determined on the basis of the BJH method of fine particles for image display in Example 1A and Comparative Example 1A and representing pore size distribution determined on the basis of the MP method of fine particles for image display in Example 1, respectively. Furthermore, FIGS. 6(A) and 6(B) are graphs representing pore size distribution determined on the basis of the MP method of fine particles for image display in Example 1B and Comparative Example 1B and representing pore size distribution determined on the basis of the MP method of fine particles for image display in Examples 1 and Comparative Example 1A, respectively. FIG. 7(A) is a graph of the results on the pore size distribution obtained by the non-localized density functional theory method for porous carbon materials in Example 1. A graph for the results of pore size distribution of porous carbon materials in Example 1 obtained by the non-localized density functional theory method is illustrated in FIG. 7(A) and a graph for analytical results of fine particles for image display in Example 1 by infrared spectra is illustrated in FIG. 8.

TABLE 1

|  | Specific surface area | Total pore volume | MP method | BJH method |
|---|---|---|---|---|
| Example 1 | 1020 | 0.96 | 0.42 | 0.59 |
| Example 1A | 1304 | 1.23 | 0.58 | 0.79 |
| Example 1B | 1158 | 1.07 | 0.49 | 0.67 |
| Comparative Example 1A | 117 | 1.21 | 0.00 | 1.20 |
| Comparative Example 1B | 125 | 1.01 | 0.00 | 1.11 |
| Example 3 | 749 | 0.63 | 0.47 | 0.34 |
| Comparative Example 3 | 190 | 1.10 | 0.00 | 1.25 |
| Example 4 | 789 | 1.04 | 0.35 | 0.78 |
| Comparative Example 4 | 175 | 1.00 | 0.00 | 1.38 |

As a measurement instrument for determining specific surface area and pore size, BELSORP-mini (made by Bel Japan Inc.) was used to perform nitrogen adsorption/desorption tests. As a measurement condition, the equilibrium relative pressure ($p/p_0$) measured was set from 0.01 to 0.99. Specific surface area and pore volume were calculated on the basis of the BELSORP analysis software. Pore size distribution of mesopores and micropores was obtained by performing the nitrogen adsorption/desorption test using the measurement instrument described above and analyzing the results with the BELSORP analysis software on the basis of the BJH method and MP method. Furthermore, in measurement on the basis of the non-localized density functional theory method (NLDFT method) an automatic specific surface area-pore size distribution analyzer, "BELSORP-MAX", made by Bel Japan Inc. was used and prerequisites were selected to be no assumption for analysis and a cylindrical pore model for pore shape and distribution curve data obtained are smoothed 10 times.

It can be found in FIG. 7(A) that porous carbon materials in Example 1 have at least one peak at not more than 10 nm in pore size distribution obtained by the non-localized density functional theory method. Total pore volume (unit: $cm^3/g$) obtained by the non-localized density functional theory method and a ratio of the total volume of pores having pore size within a range of not more than 10 nm relative to the volume of pores having pore size within a range of not more than 50 nm (ratio of pore size) obtained by the non-localized density functional theory method in various Examples and Comparative Examples are shown in Table 2 below.

TABLE 2

|  | Total pore volume | Ratio of pore volume |
|---|---|---|
| Example 1 | 1.269 | 0.709 |
| Example 1A | 1.657 | 0.794 |
| Example 1B | 1.439 | 0.572 |
| Comparative Example 1A | 1.108 | $0.190 \times 10^{-5}$ |
| Comparative Example 1B | 1.120 | $0.600 \times 10^{-4}$ |
| Example 3 | 1.438 | 0.709 |
| Comparative Example 3 | 1.453 | $0.650 \times 10^{-3}$ |
| Example 4 | 1.747 | 0.779 |
| Comparative Example 4 | 1.296 | $0.122 \times 10^{-3}$ |

Elemental analysis was performed for fine particles for image display in Example 1. As an instrument for elemental analysis, an energy dispersive X-ray spectrometer (JED-2200F made by JEOL, Ltd.) was used to quantify each element with the energy dispersive spectroscopy (EDS) followed by calculating content by percent as a mass ratio (mass by percent). Measurement conditions were set at accelerating voltage of 15 kV and beam current of 13 µA. In fine particles for image display in Example 1 in which acid treatment and nitric acid treatment were performed contents by percent in silicon (Si), oxygen (O), potassium (K), calcium (Ca), and sodium (Na) were decreased. Among them contents by percent of silicon (Si) and oxygen (O) were substantially decreased to not more than 1% by mass. In fine particles for image display which were produced by carbonizing husks as a raw material at 500° C. to 1,400° C. followed by treatment with an acid, it was confirmed that content by percent of silicon (Si) was not more than 1% by mass, content by percent of magnesium (Mg) was not less than 0.01% by mass but not more than 3% by mass, content by percent of potassium (K) was not less than 0.01% by mass but not more than 3% by mass, and content by percent of calcium (Ca) was not less than 0.05% by mass but not more than 3% by mass. It was also confirmed that content by percent of phosphorous (P) was not less than 0.01% by mass but not more than 3% by mass and content by percent of sulfur (S) was not less than 0.01% by mass but not more than 3% by mass. As other elements, the amount of carbon (C) was the highest, reaching to not less than 90% of all other elements. Silicon was herein contained as an amorphous silica component in husks and content by percent of silicon in husks as the raw material was 9.4% by mass.

From the fact that contents of silicon (Si) and oxygen (O) in the fine particles for image display in Example 1 were substantially decreased, it was suggested that a large amount of silicon dioxide was contained in carbonaceous substances (precursor for porous carbon materials). It was suggested that acid treatment of a precursor for porous carbon materials removes silicon components contained including silicon dioxide, contributing to an increase in specific surface area. Furthermore, it was confirmed that acid treatment increased the numbers of mesopores and micropores. This trend was similar in the examples described below. Similar results were obtained in fine particles for image display, in which an alkali (base) including aqueous sodium hydroxide solution instead of an aqueous hydrofluoric acid solution was used for treatment.

In an image display device using the electrophoretic dispersion liquid 50 in Example 1, an image display part was black reflecting the color of the electrophoretic dispersion liquid 50 (refer to a fragmentary schematic sectional view of FIG. 1(A)). When voltage of 10 V was applied between the first electrode 21 and the second electrode 31, it was confirmed that a gap part between comb-shaped electrodes and an upper part of one of two electrodes became transparent, confirming migration of the finer particles for image display 51 exhibiting a black color (refer to a fragmentary schematic sectional view of FIG. 1(C)). When application of voltage was stopped, an image display part turned black after a little while. Furthermore, when voltage is applied again, a gap part between comb-shaped electrodes and an upper part of one of electrodes became transparent, confirming migration of the fine particles for image display 51 to be reversible.

Materials in which acid treatment and steam activation treatment were performed on the precursor of porous carbon materials described above were used as a starting material for producing fine particles for image display. 142.8 g of sodium peroxodisulfate were dissolved in 300 mL of water, to which 0.6 g of the starting material were added to stir for 12 hours and then filtered and washed with 1 L of purified water to yield fine particles for image display (referred to as fine particles of image display in Example 1B), which were diluted with purified water to adjust the concentration to 0.005% by mass to measure a zeta potential. As a result, it was −86.7 mV. Average particle diameter of fine particles for image display obtained was 164.6 nm. Specific surface area, total pore volume, results of pore volume determined by the MP method, and results of pore volume determined by the BJH method of fine particles for image display in Example 1B were shown in Table 1. A graph of the results of pore size distribution obtained by the non-localized density functional theory method of fine particles for image display in Example 1B is illustrated in FIG. 7(B).

Figure 13:
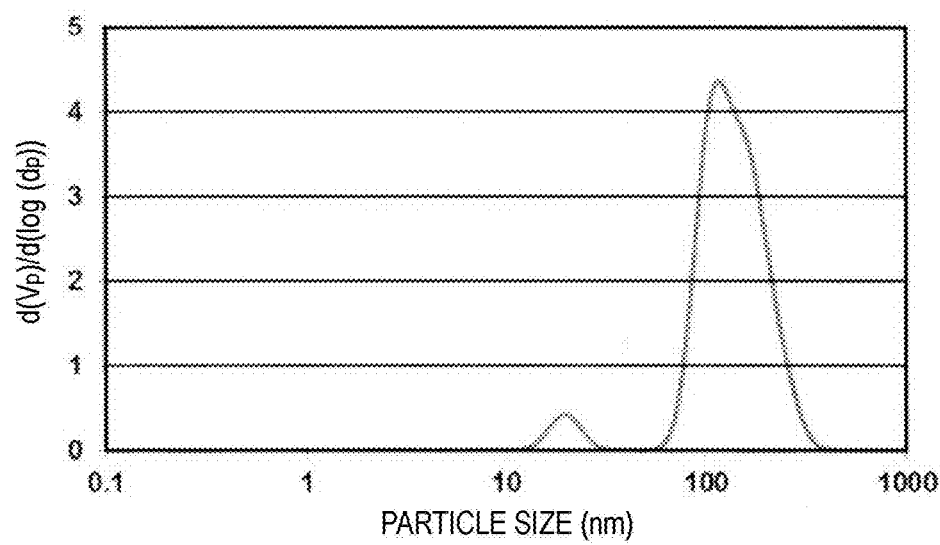
FIGS. 13(A) and 13(B) are graphs of measurement results of pore size distribution of fine particles for image display in Comparative Example 1A and Comparative Example 1B obtained by the non-localized density functional theory method, respectively.
Figure 13:
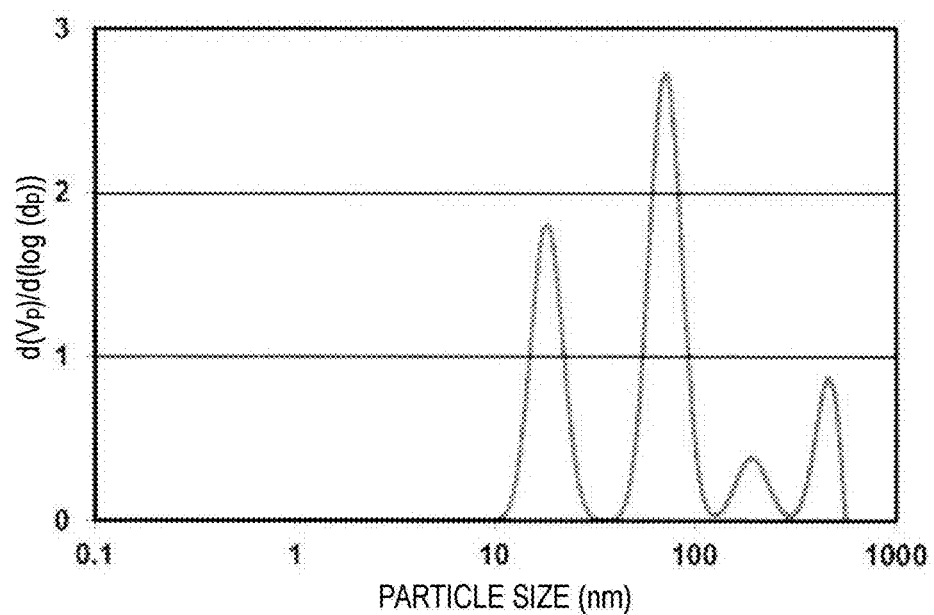

A graph of the results of pore size distribution obtained by the non-vertical density functional theory method of commercially available general-purpose carbon black (#20 made by Mitsubishi Chemical Corporation) as Comparative Example 1A is illustrated in FIG. 13(A). Materials in Comparative Example 1A were used as a starting material and treated similarly to Example 1B, yielding fine particles for image display in Comparative Example 1B. A graph of the results of pore size distribution obtained by the non-localized density functional theory method in Comparative Example 1B is illustrated in FIG. 13(B). Measurement results of specific surface area in Comparative Examples 1A and 1B are shown in Table 1. Furthermore, a zeta potential of fine particles for image display in Comparative Example 1B was determined using a similar method to Example 1B resulting in +0.71 mV.

EXAMPLE 2

Example 2 is modification of Example 1. Fragmentary schematic sectional views of an image display device in Example 2 are illustrated in FIGS. 2(A) and 2(B).

A vertical electric field cell-type image display device 510 in Example 2 was an image display device having the electrophoretic dispersion liquid 50 sealed between two opposing substrates 520 and 530. Specifically, the first substrate 520 provided with a first electrode 521 and the second substrate 530 provided with a second electrode 531 were disposed so as to face each other at a given distance through a barrier 541. A substrate placed nearer to the side of the image viewer was the second substrate 530. A first insulation layer 522 was formed on the first electrode 521 and a second insulation layer 532 was formed on the second substrate 531. The electrophoretic dispersion liquid 50 was sealed between the two opposing substrates 520 and 530, specifically, in pixels (display elements) divided by the first substrate 520, the second substrate 530, and the barrier 541. The reference number 540 denotes a sealing member. The second electrode 531 was a common electrode commonly provided for a plurality of pixels (display elements). On the other hand, the first electrode 521 was an electrode provided for each and every pixel (display element) and voltage applied to the first electrode 521 was regulated by a switching device (specifically, thin film transistor (TFT)) provided on the first substrate 521 while not illustrated. On-off control of the thin film transistor was performed on the basis of a drive circuit not illustrated, from which selection signals were applied to pixels in each row and control signals were applied to pixels in each column. Such a pixel driving method was applied to each pixel unit enabling to display any images and characters with many pixels. The electrophoretic dispersion liquid 50 was herein constituted with the electrophoretic dispersion liquid 50 described in Example 1. Specific surface area and pore volume of fine particles for image display were determined to give the results shown in Table 3.

The first substrate 520 and the second substrate 530 were constituted with soda glass with a thickness of 0.7 mm. The second electrode 531 included a transparent electrode constituted with indium-tin complex oxide (ITO) and the first electrode 521 contained indium-tin complex oxide (ITO) and was formed by a physical vapor deposition (PVD) method including a sputtering method and a vacuum deposition method in combination with a liftoff method. Furthermore, the first insulation layer 522 and the second insulation layer 532 were constituted with colorless transparent insulation resins, specifically, acrylic resins. Pixels (display elements) were divided by the barrier 541 containing photosensitive resins, the barrier 541 was formed on the first substrate 520 by a photolithography method, and the top surface of the barrier 541 was adhered to the second substrate 530 with an adhesive (not illustrated). A height of the barrier 541 was 50 μm. Filling of pixels (display elements) with an electrophoretic dispersion liquid was performed, for example, by an ink jet method.

Figure 2:
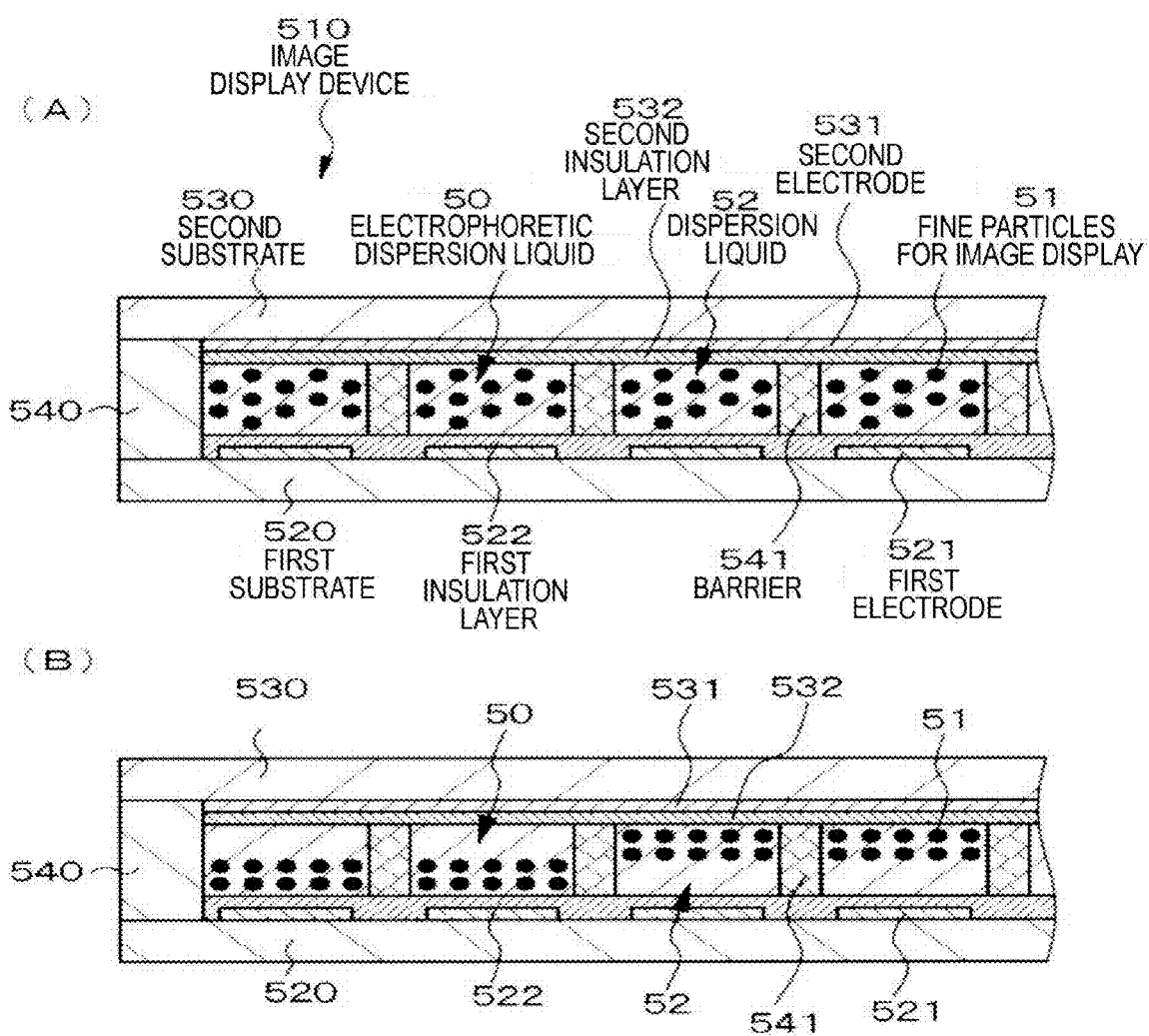
FIGS. 2(A) and 2(B) are fragmentary schematic sectional views of an image display device in Example 2.

For example, a state in which the second electrode 531 was connected to ground and a voltage was not applied to the first electrode 521 is illustrated in FIG. 2(A). A state in which when an appropriate voltage was applied to the first electrode 521, the fine particles for image display 51 in an electrophoretic dispersion liquid were moved within one pixel toward and gathered on the first electrode 521 or moved toward and gathered on the second electrode 531 is illustrated in FIG. 2(B). In FIG. 2(B), polarity of the applied voltage to the first electrode 521 in two pixels (display elements) on the left side and polarity of the applied voltage to the first electrode 521 in two pixels (display elements) on the right side are opposite polarity. This gives the two pixels (display elements) on the left side mainly a visible color of the dispersion liquid 52. On the other hand, in the two pixels (display elements) on the right side, a black color of the fine particles for image display 51 can be visible.

Except as described above, the image display device in Example 2 can have similar constitution to the image display device described in Example 1 so that detailed explanation is omitted.

Figure 9:
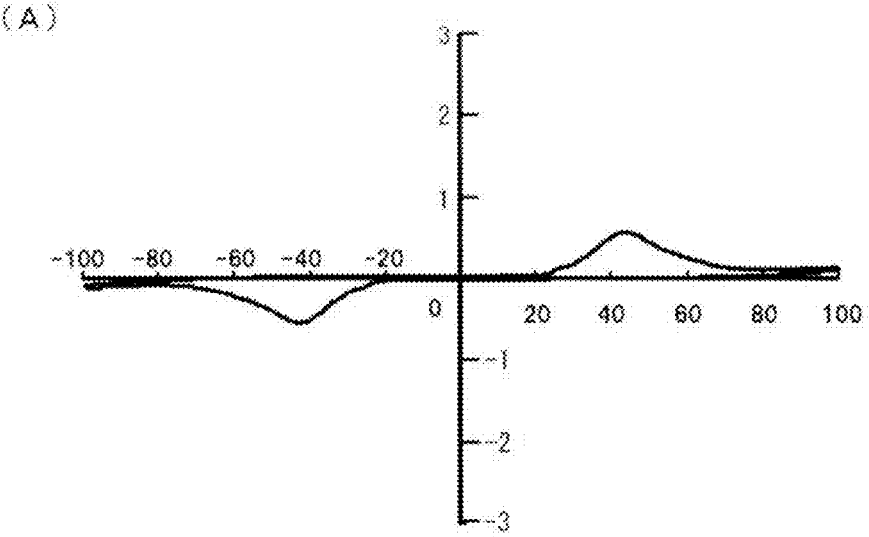
FIGS. 9(A) and 9(B) are current-voltage curves obtained in an image display device in Example 2 and an image display device in Comparative Example 2A, respectively.
Figure 9:
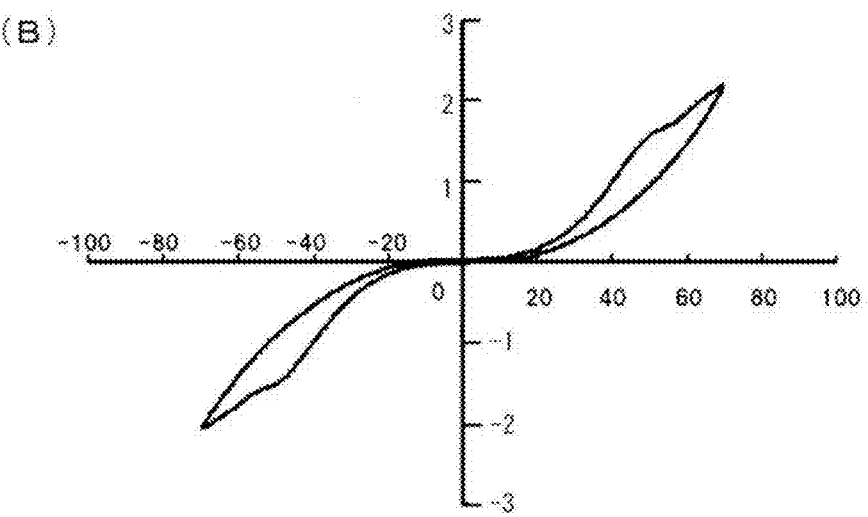
Figure 10:
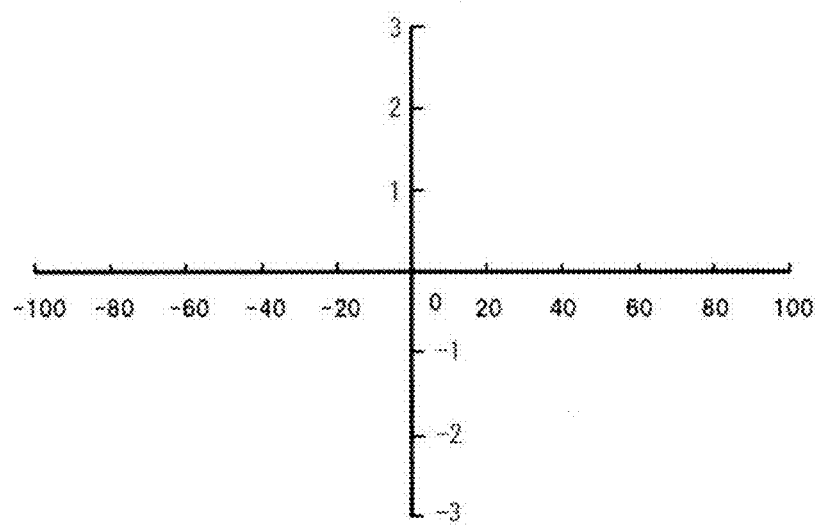
FIG. 10 is a current-voltage curve obtained in an image display device in Comparative Example 2B.

When an electrophoretic dispersion liquid in which the electrophoretic dispersion liquid in Example 1 was diluted with an equal amount of an Isopar G liquid was used for testing and a voltage of a sine wave at 1 Hz and ±100 V was applied to the electrodes 521 and 531 in an image display device in which a distance between the first and second substrates was 50 μm and a total area of electrodes was 1.0 cm$^2$, a current-voltage curve illustrated in FIG. 9(A) was obtained. The horizontal axis in FIG. 9(A) or 9(B) and 10 described below corresponded to an applied voltage (unit: volt) to the first electrode and the second electrode was connected to ground. The vertical axis corresponded to a current (unit: ×10$^{-6}$ ampere) flowing between the first electrode and the second electrode. The measurement was repeated 10 times to reproduce the same results. The results indicate the fine particles for image display 51 migrated toward the electrode and the migration was reversible.

As Comparative Example 2A, 9.9 g of an Isopar G liquid containing 1% by mass of a dispersing agent (Solsperse 17000) were added to 0.1 g of commercially available oxidized carbon black (MA220 made by Mitsubishi Chemical Corporation) to disperse using a bead mill yielding an electrophoretic dispersion liquid in black. When a voltage of a sine wave at 1 Hz and ±80 V was applied to the electrodes 521 and 531 using the electrophoretic dispersion liquid in an image display device similar to the one in Example 2, a current-voltage curve illustrated in FIG. 9(B) was obtained. The measurement was repeated 10 times to give different current-voltage curves in every measurement finally causing a short circuit between electrodes due to agglomeration of oxidized carbon black. Cause of such phenomena is considered to be due to difference in values of pore volume determined by the BJH method and MP method of oxidized carbon black and difference in the state of the surface in oxidized carbon black as compared to the fine particles for image display 51 in Example 2.

As Comparative Example 2B, commercially available general-purpose carbon black (#20 made by Mitsubishi Chemical Corporation) used in Comparative Example 1A was treated with nitric acid similarly to Example 1 and 9.9 g of an Isopar G liquid containing 1% by mass of a dispersing agent (Solsperse 17000) was added to 0.1 g of the carbon black obtained to disperse with a bead mill yielding an electrophoretic dispersion liquid in black. When a voltage of a sine wave at 1 Hz and ±80 V was applied to the electrodes 521 and 531 using the electrophoretic dispersion liquid in an image display device similar to the one in Example 2, a current-voltage curve illustrated in FIG. 10 was obtained. That is, current-voltage plots gave a straight line nearly overlapping the Y-axis of FIG. 10 and a short circuit occurred in first measurement. This indicates that in Comparative Example 2B, dispersion of carbon black was poor or carbon black was agglomerated in first electrophoresis. When the image display device described in Example 1 was manufactured using an electrophoretic dispersion liquid in black obtained in Comparative Example 2B and a voltage of 10 V was applied between the first electrode 521 and the second electrode 531, a gap part between comb-shaped electrodes did not turn transparent.

TABLE 3

|  | Specific surface area | Average particle size |
| --- | --- | --- |
| Example 2 | 1012 | 0.5 μm |
| Comparative Example 2A | 74 | 55 nm |
| Comparative Example 2B | 115 | 50 nm |

An image display device with a traverse electric field type can be used in Example 2. A fragmentary schematic sectional view of a modified example 510A for the image display device in Example 2 is illustrated in FIGS. 3(A) and 3(B).

In the modified example 510A of the image display device in Example 2, the second substrate 530 and the first substrate 520 provided with the first electrode 521 and the second electrode 531 were facing each other at a given distance through the barrier 541. The second electrode 531, the second insulation layer 532, the first electrode 521, and the first insulation layer 522 were sequentially formed on the first substrate 520. While not illustrated, a configuration in which the first electrode 521, the first insulation layer 522, the second electrode 531, and the second insulation layer 532 were sequentially formed on the first substrate 520 can be used. The electrophoretic dispersion liquid 50 was sealed between the two opposing substrates 520 and 530, specifically, a pixel (image elements) divided by the first substrate 520, the second substrate 530, and the barrier 541.

Figure 3:
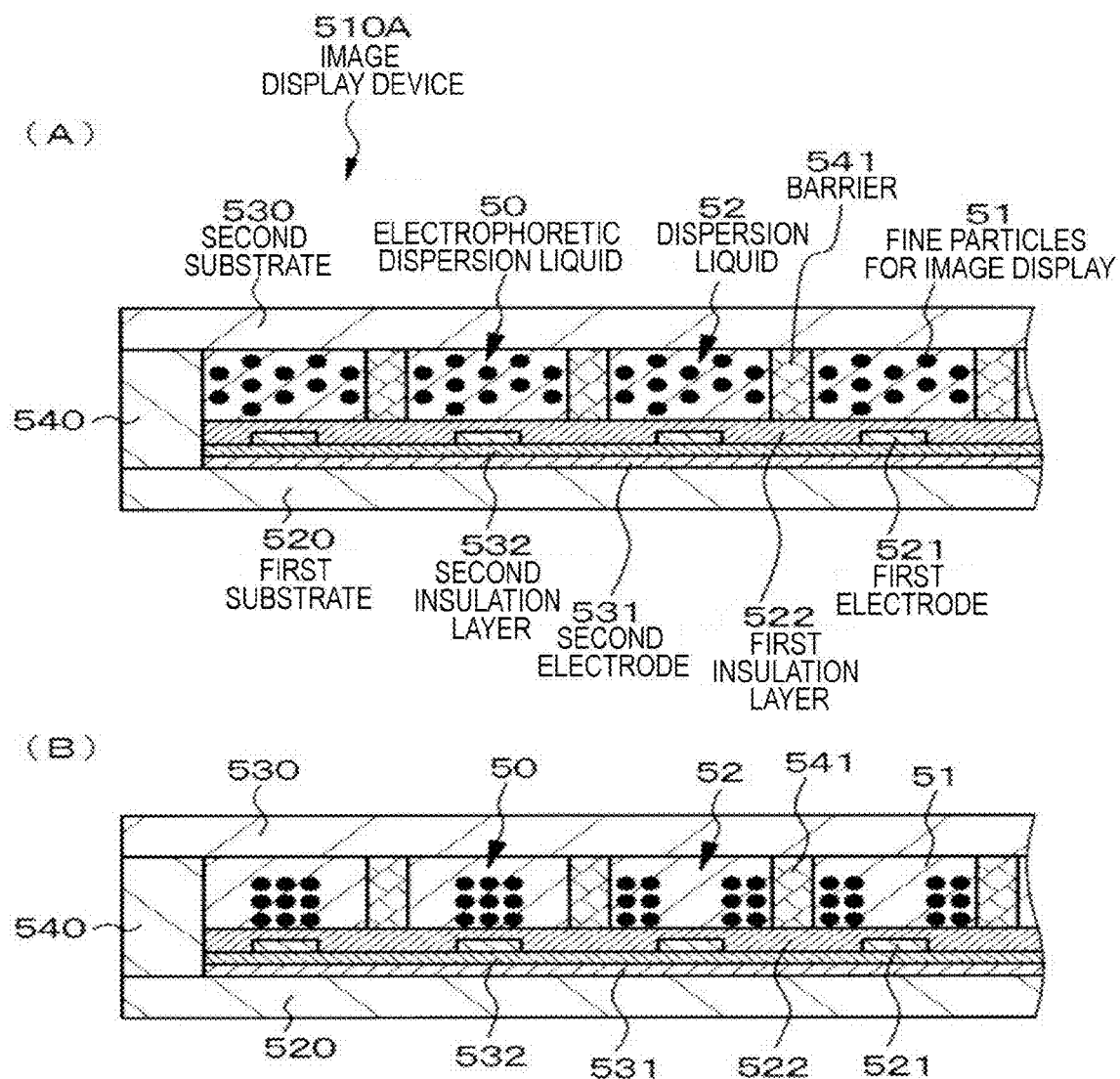
FIGS. 3(A) and 3(B) are fragmentary schematic sectional views of an image display device in a modified example of Example 2.

For example, a state in which the second electrode 531 was connected to ground and a voltage was not applied to the first electrode 521 is illustrated in FIG. 3(A). A state in which when an appropriate voltage was applied to the first electrode 521, the fine particles for image display 51 in an electrophoretic dispersion liquid were within one pixel moved toward and gathered on the first electrode 521 or moved toward and gathered on the second electrode 531 is illustrated in FIG. 3(B). In FIG. 3(B), polarity of the applied voltage to the first electrode 521 in two pixels (display elements) on the left side and polarity of the applied voltage to the first electrode 521 in two pixels (display elements) on the right side were opposite polarity. This gave different image sequence pattern of the fine particles for image display 51 between the two pixels (display elements) on the left side and the two pixels (display elements) on the right side, allowing for recognition of an image. In the example, the dispersion liquid 52 was transparent in color.

Alternatively, a structure in which an electrophoretic dispersion liquid is sealed in microcapsules can be used. Such structures themselves are well-known and description thereof is omitted.

EXAMPLE 3

In Example 3, fine particles for image display having a positive charge were manufactured. Specifically, materials in which acid treatment and steam activation treatment were performed for a precursor for porous carbon materials described in Example 1 were used as a starting material for producing fine particles for image display. 0.3 g of the starting material was added to 100 g of a 1% solution of sodium silicate, which was treated with ultrasonic wave for 30 minutes. The mixture obtained was heated to 90° C. to 95° C., to which 15 mL of sulfuric acid with the concentration of 0.22 mol/L were added over 2 hours. 4 mL of sulfuric acid with the concentration of 4 mols was then added to the mixture, which was stirred for 1 hour, followed by centrifugal separation and the process involving dispersion and centrifugal separation using a 1:10 mixture of water and ethanol was repeated twice. 300 mL of a 1:10 mixture of water and ethanol were added to the solid obtained, to which 4 g of N-[3-(trimethoxysilyl)propyl]-N'-(4-vinylbenzyl)ethylenediamine hydrochloride were added to stir for 7 minutes. The solution was then separated by centrifugation to yield solids and the process in which ethanol was added to the solids to disperse and the mixture was separated by centrifugation was repeated twice. Subsequently, the solid was dried under reduced pressure at ambient temperature for 24 hours and at 70° C. for 2 hours. The material obtained was dissolved in 300 mL of ethyl acetate, to which 4 g of 2-ethylhexyl methacrylate were added to heat to 50° C. to stir for 1 hour. 0.1 g of 2,2'-azobis(2-methylpropionitrile) (AIBN) were then added to the mixture, which was heated to 65° C. to stir 7 hours. The solution obtained was separated by centrifugation and the process of dispersion and centrifugal separation using ethyl acetate was repeated twice and the solids were dried under reduced pressure at ambient temperature for 24 hours and at 70° C. for 2 hours to yield fine particles for image display in Example 3. Using, as a starting material, commercially available general-purpose carbon black (#20 made by Mitsubishi Chemical Corporation) used in Comparative Example 1A, fine particles for image display obtained using a similar process to Example 3 were used in Comparative Example 3.

Figure 11:
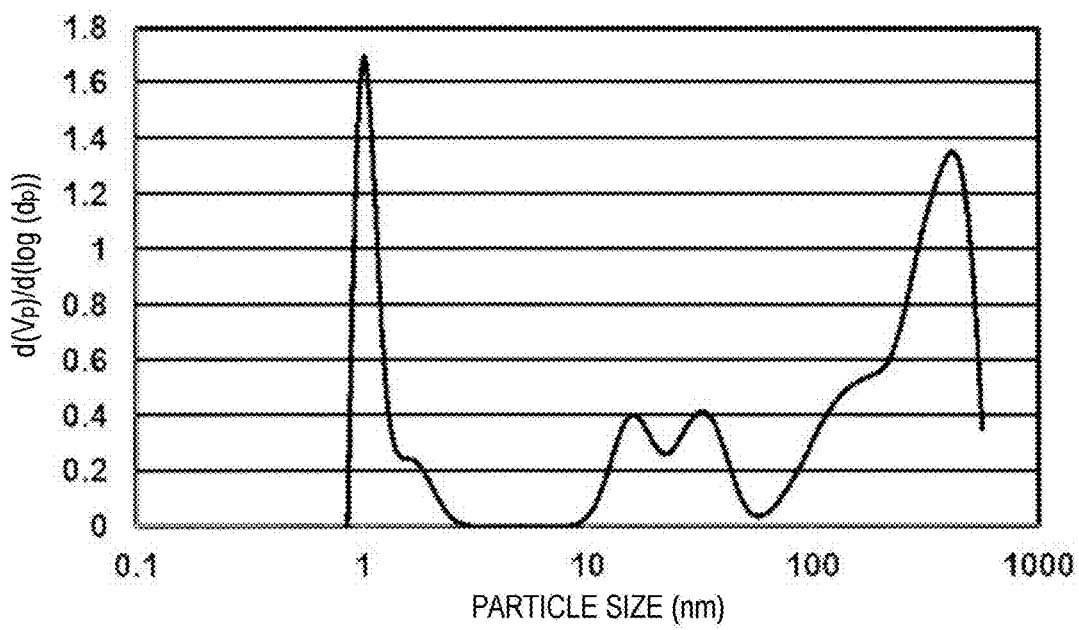
FIGS. 11(A) and 11(B) are graphs of measurement results of pore size distribution of fine particles for image display in Example 3 and Example 4 obtained by the non-localized density functional theory method, respectively.
Figure 11:
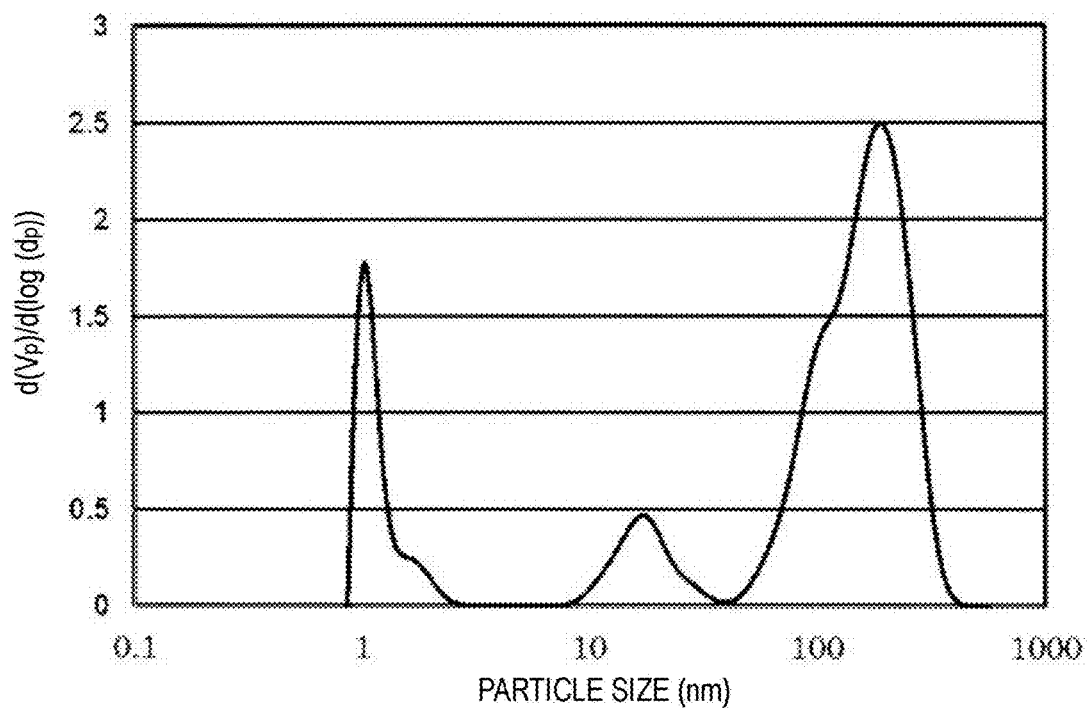
Figure 12:
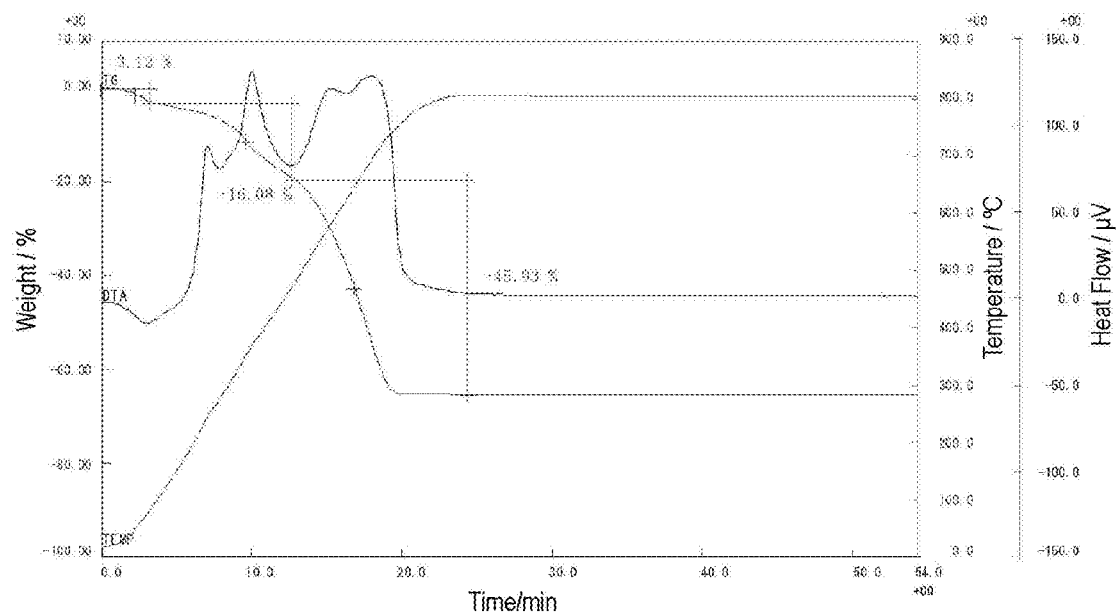
FIGS. 12(A) and 12(B) are graphs representing TG-DTA curves in fine particles for image display in Example 3 and Example 4, respectively.
Figure 12:
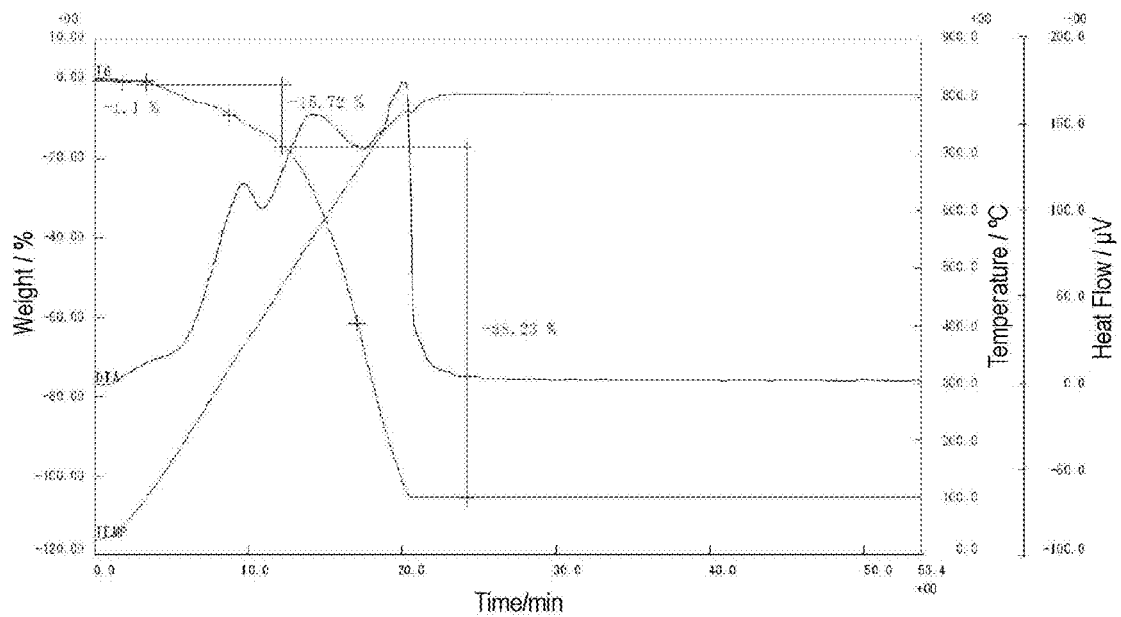
Figure 14:
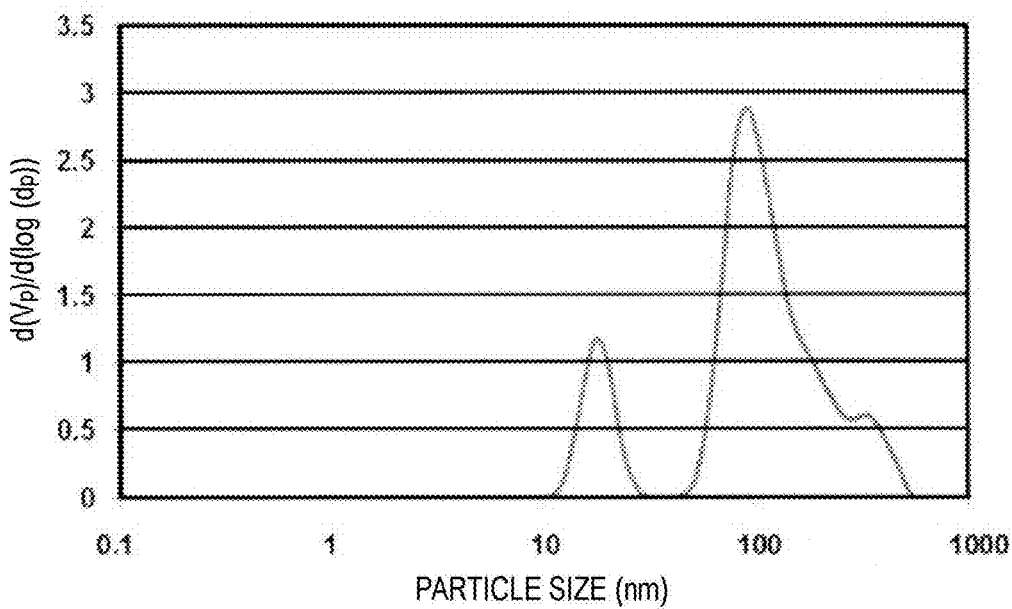
FIGS. 14(A) and 14(B) are graphs of measurement results of pore size distribution of fine particles for image display in Comparative Example 3 and Comparative Example 4 obtained by the non-localized density functional theory method, respectively.
Figure 14:
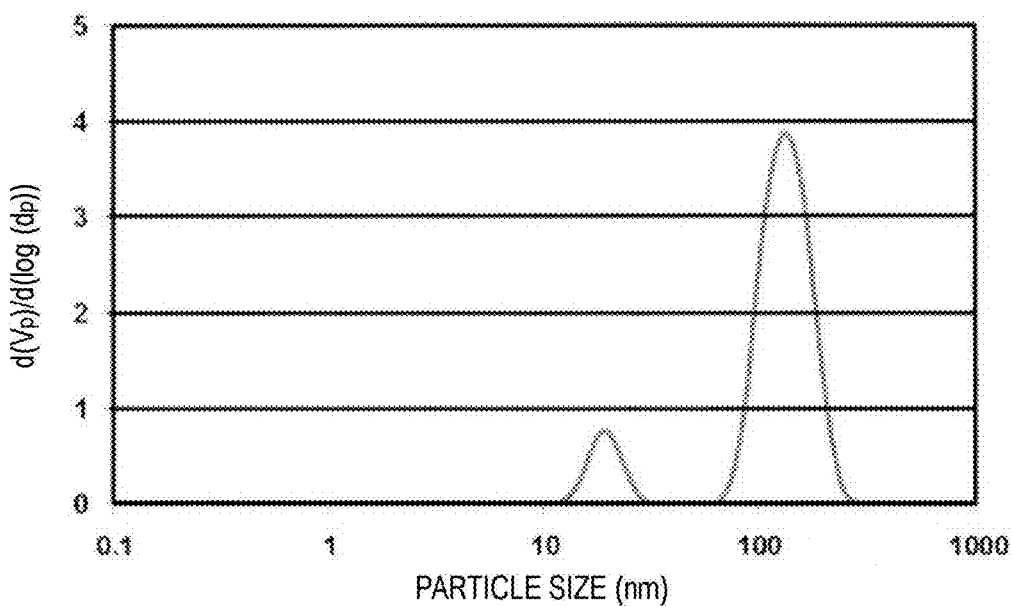
Figure 15:
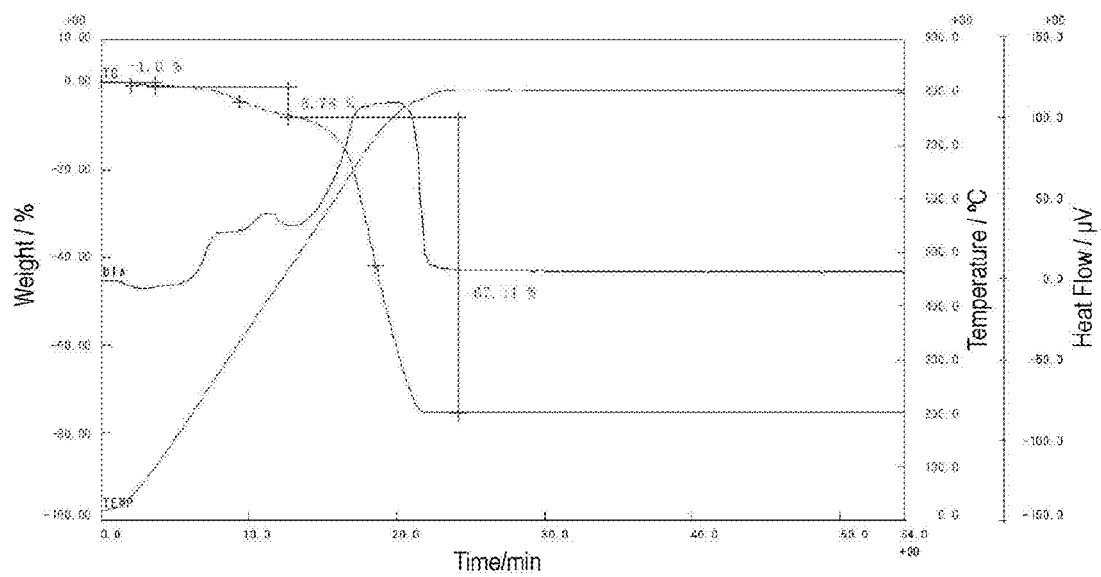
FIGS. 15(A) and 15(B) are graphs representing TG-DTA curves in fine particles for image display in Comparative Example 3 and Comparative Example 4, respectively.
Figure 15:
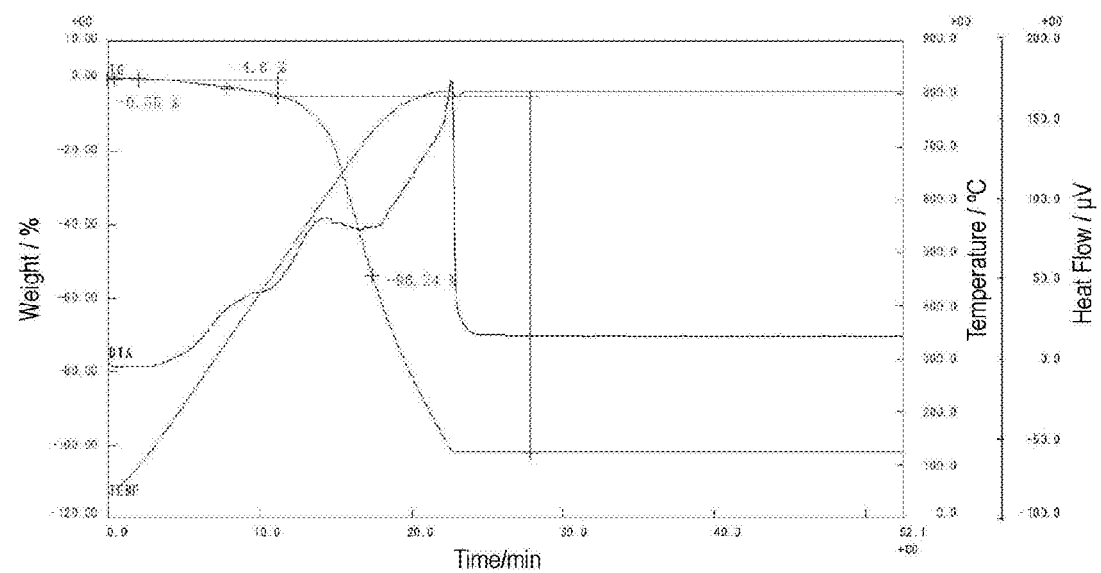
Figure 16:
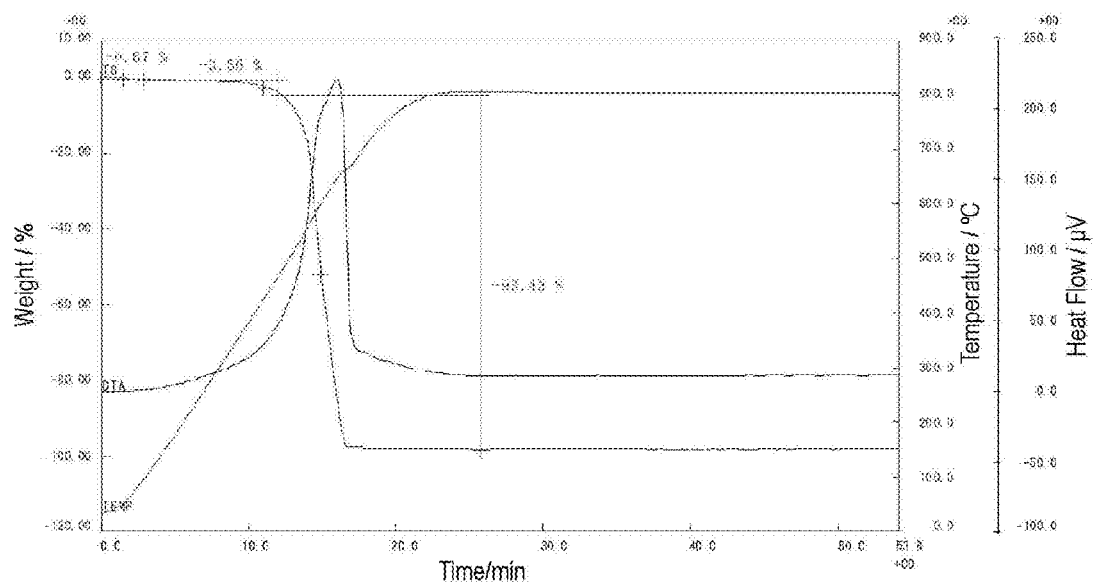
FIGS. 16(A) and 16(B) are graphs representing TG-DTA curves in fine particles for image display subjected to acid treatment and steam activation treatment (but no treatment with nitric acid) in Example 1 and fine particles for image display in Comparative Example 1A, respectively.
Figure 16:
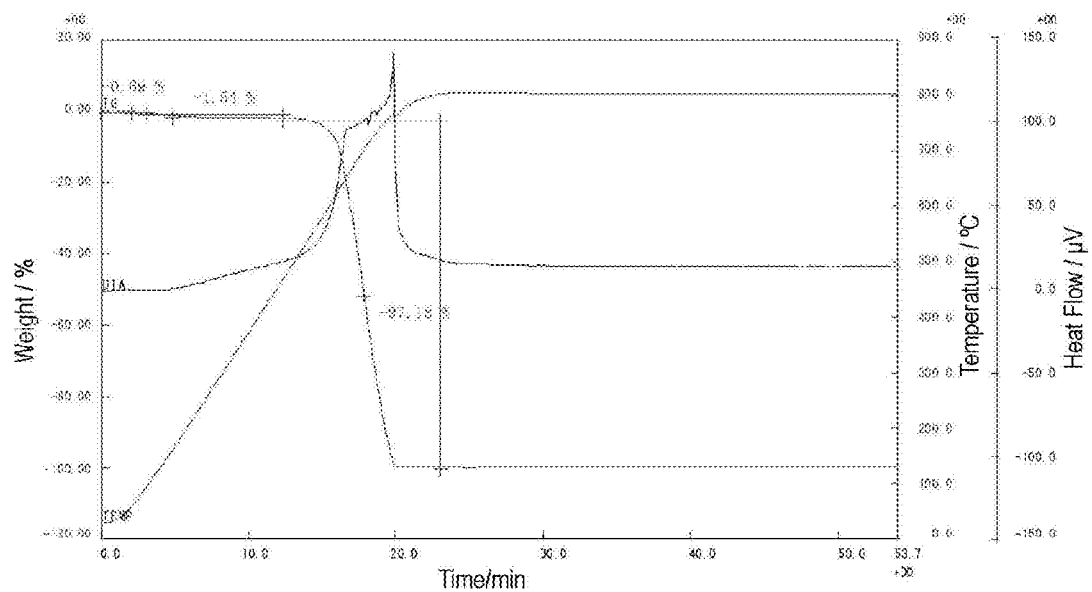

Specific surface area, total pore volume, results of pore volume determined by the MP method, and results of pore volume determined by the BJH method of fine particles for image display in Example 3 and Comparative Example 3 are shown in Table 1. Results of pore size distribution obtained by the non-localized density functional theory method are illustrated in FIG. 11(A) and a TG/DTA curve is illustrated in FIG. 12(A). Results of pore size distribution obtained by the non-localized density functional theory method in fine particles for image display in Comparative Example 3 and Comparative Example 4 described below are illustrated in FIGS. 14(A) and 14(B) and furthermore, TG/DTA curves in fine particles for image display in Comparative Example 3 and Comparative Example 4 described below are illustrated in FIGS. 15(A) and 15(B), respectively, and for reference, TG/DTA curves in fine particles for image display treated with an acid or steam activation (not treated with nitric acid) in Example 1 and fine particles for image display in Comparative Example 1A are illustrated in FIGS. 16(A) and 16(B), respectively.

TG/DTA curves for fine particles for image display were determined in air and a modification ratio with organic molecules in porous carbon materials was obtained by the following formula provided that a ratio of mass decrease in TG/DTA curves in each condition is defined below. A modification ratio with organic molecules in fine particles for image display in Example 3 was 32.0% and that in Comparative Example 3 was 6.2%.

Modification ratio with organic molecules=$MR_{21}/MR_{22}-MR_{11}/MR_{12}$ $MR_{21}$: A ratio of mass decrease of a sample after surface modification treatment when heated from 100° C. to 470° C.

$MR_{22}$: A ratio of mass decrease of a sample after surface modification when heated from 470° C. to 800° C.

$MR_{11}$: A ratio of mass decrease of a sample before surface modification treatment when heated from 100° C. to 470° C.

$MR_{12}$: A ratio of mass decrease of a sample before surface modification treatment when heated from 470° C. to 800° C.

An Isopar G liquid was adjusted such that content of Solsperse 17000 was 25% by mass and content of fine particles for image display in Example 3 was 2% by mass and stirred for 2 hours using a homogenizer, followed by centrifugal separation to recover the supernatant liquid (electrophoretic dispersion liquid). The supernatant liquid was diluted 1/1000 to determine a zeta potential, which was +47.87 mV. Measurement of a zeta potential of fine particles for image display in Comparative Example 3 gave—9.27 mV.

EXAMPLE 4

In Example 4, the same starting material as Example 3 was used to formulate fine particles for image display using the method described below. That is, to 150 mL of purified water were added 0.6 g of the starting material, 0.15 g of 4-vinylaniline, and 0.9 mL of 2 mol HCl, which was heated to 40° C. with stirring. Subsequently, a solution in which 0.087 g of sodium nitrite was dissolved in 10 mL of purified water was added to the mixture, which was stirred for 16 hours. The solution in which the reaction was completed was separated by centrifugation and a process of dispersion of the solids using acetone and precipitation by centrifugal separation was repeated twice. The solids obtained were then dried under reduced pressure at ambient temperature for 24 hours and at 70° C. for 2 hours. The material obtained in this way was dissolved in 300 mL of ethyl acetate, to which 4 g of 2-ethylhexyl methacrylate were added to heat to 50° C. and stirred for 1 hour. 0.1 g of AIBN was then added to the mixture, which was heated to 65° C. and stirred for 7 hours. The solution obtained was then separated by centrifugation and a process involving dispersion using ethyl acetate and centrifugal separation was repeated twice. Subsequently, the solids obtained were dried under reduced pressure at ambient temperature for 24 hours and 70° C. for 2 hours to yield fine particles for image display in Example 4. Using as a starting material commercially available general-purpose carbon black (#20 made by Mitsubishi Chemical Corporation) used in Comparative Example 1A, fine particles for image display obtained using a similar process to Example 4 were used in Comparative Example 4. A modification ratio with organic molecules in fine particles for image display in Example 4 was 14.0% and that in Comparative Example 4 was 3.2%.

An Isopar G liquid was adjusted such that content of fine particles for image display in Example 4 was 2% by mass, content of Solsperse 17000 was 10% by mass and content of tridecyl amine was 5% by mass, and stirred for 4 hours using a homogenizer, followed by centrifugal separation to recover the supernatant liquid (electrophoretic dispersion liquid). A zeta potential of the supernatant liquid obtained was determined to be +36.26 mV. Specific surface area, total pore volume, results of pore volume determined by the MP method, and results of pore volume determined by the BJH method of fine particles for image display in Example 4 were the same as the measurement results for fine particles for image display in Example 3. Results of the pore size distribution obtained by the non-localized density functional theory method are illustrated in FIG. 11(B) and a TG/DTA curve is illustrated in FIG. 12(B). Measurement of a zeta potential of fine particles for image display in Comparative Example 4 gave −5.14 mV.

The present invention has so far been described on the basis of preferred examples, but is not limited to the examples but various modifications are possible. In the examples, cases in which husks, straws, reeds or wakame stems were used as a raw material for fine particles for image display have been described, but other plants can be used as a raw material. As other plants, for example, vascular plants, ferns, and bryophytes living on land, algae, and seaweeds can be mentioned, but one of them or a mixture of a plurality of them can be used. The constitution and structure of the fine particles for image display, the methods for producing fine particles for image display, the electrophoretic dispersion liquids, and the constitution and structure of the image display devices described in examples are illustrated only for exemplification, and can be appropriately modified.

In the fine particles for image display in the present invention, an appropriate range of values for specific surface area determined on the basis of the nitrogen BET method and contents by percent of various elements have been described, but the description does not completely negate the possibility that values of specific surface area and contents by percent of various elements are beyond the range described above. That is, the appropriate range is only a particularly preferred range to obtain the effects of the present invention and values of specific surface area can be slightly beyond the range as long as the effects of the present invention can be achieved. Starting materials for fine particles for image display, an electrophoretic dispersion liquid, and fine particles for image display in an image display device are not limited to plant-based materials.

REFERENCE SIGNS LIST 10, 510, 510A Image display device
20, 521 First substrate
21, 522 First electrode
22, 522, 532 Insulation layer
30, 530 Second substrate
31, 531 Second electrode
40, 540 Sealing member
541 Barrier
50 Electrophoretic dispersion liquid (dispersion liquid of electrophoretic particles)
51 Fine particles of image display (electrophoretic particles)
52 Dispersion liquid (dispersion medium of electrophoretic particle)

The invention claimed is:

1. An electrophoretic dispersion liquid suitable for use in an image display device, the electrophoretic dispersion liquid comprising a plurality of fine particles dispersed in the electrophoretic dispersion liquid in a ratio range of 0.1 to 15 parts by mass of fine particles to 100 parts by mass of dispersion liquid, wherein:
the fine particles are comprised of (a) activated porous carbon materials formed from carbonized plant-based materials treated with an acid or alkali and having specific surface area values, determined by a nitrogen BET method, of not less than 100 $m^2/g$ and pore volume values, determined by an MP method, of not less than 0.1 $cm^3/g$, (b) an amount of magnesium in the range of 0.01% by mass to 3% by mass, both inclusive, (c) an amount of potassium in the range of 0.01% by mass to 3% by mass, both inclusive, and (d) an amount of calcium in the range of 0.05% to 3% by mass, both inclusive; and
the fine particles have modified surfaces to have increased positive or negative charges relative to an amount of positive or negative charges, respectively, that would be present had the surfaces not been modified,
wherein,
the porous carbon materials have at least one peak at not more than 10 nm in pore size distribution obtained by a non-localized density functional theory method,
a ratio of a total volume of the pores having a pore size within a range of not more than 10 nm relative to a total volume of the pores having a pore size within a range of not more than 50 nm is not less than 0.1 but not more than 0.99, and
the porous carbon materials contain C in an amount not less than 90.0% by mass.

2. An electrophoretic dispersion liquid suitable for use in an image display device, the electrophoretic dispersion liquid comprising a plurality of fine particles dispersed in the electrophoretic dispersion liquid in a ratio range of 0.1 to 15 parts by mass of fine particles to 100 parts by mass of dispersion liquid, wherein:
the fine particles are comprised of (a) activated porous carbon materials formed from carbonized plant-based materials treated with an acid or alkali having specific surface area values, determined by a nitrogen BET method, of not less than 100 $m^2/g$ and at least one peak at not less than 10 nm in pore size distribution obtained by a non-localized density functional theory method, (b) an amount of magnesium in the range of 0.01% by mass to 3% by mass, both inclusive, (c) an amount of potassium in the range of 0.01% by mass to 3% by mass, both inclusive, and (d) an amount of calcium in the range of 0.05% to 3% by mass, both inclusive, and
the fine particles have modified surfaces to have increased positive or negative charges relative to an amount of positive or negative charges, respectively, that would be present had the surfaces not been modified,
wherein,
the porous carbon materials have at least one peak at not more than 10 nm in pore size distribution obtained by a non-localized density functional theory method,
a ratio of a total volume of the pores having a pore size within a range of not more than 10 nm relative to a total volume of the pores having a pore size within a range of not more than 50 nm is not less than 0.1 but not more than 0.99, and
the porous carbon materials contain C in an amount not less than 90.0% by mass.

3. An electrophoretic dispersion liquid suitable for use in an image display device, the electrophoretic dispersion liquid comprising a plurality of fine particles dispersed in the electrophoretic dispersion liquid, in a ratio range of 0.1 to 15 parts by mass of fine particles to 100 parts by mass of dispersion liquid, wherein:
the fine particles are comprised of (a) activated porous carbon materials formed from carbonized plant-based materials treated with an acid or alkali having specific surface area values, determined by a nitrogen BET method, of not less than 100 $m^2/g$ and average particle size of not less than $1 \times 10^{-8}$ m but not more than $2 \times 10^{-4}$ m, (b) an amount of magnesium in the range of 0.01% by mass to 3% by mass, both inclusive, (c) an amount of potassium in the range of 0.01% by mass to 3% by mass, both inclusive, and (d) an amount of calcium in the range of 0.05% to 3% by mass, both inclusive, and
the fine particles have modified surfaces to have increased positive or negative charges relative to an amount of positive or negative charges, respectively, that would be present had the surfaces not been modified,
wherein,
the porous carbon materials have at least one peak at not more than 10 nm in pore size distribution obtained by a non-localized density functional theory method,
a ratio of a total volume of the pores having a pore size within a range of not more than 10 nm relative to a total volume of the pores having a pore size within a range of not more than 50 nm is not less than 0.1 but not more than 0.99, and
the porous carbon materials contain C in an amount not less than 90.0% by mass.

4. An electrophoretic dispersion liquid suitable for use in an image display device, the electrophoretic dispersion liquid comprising a plurality of fine particles dispersed in the electrophoretic dispersion liquid in a ratio range of 0.1 to 15 parts by mass of fine particles to 100 parts by mass of dispersion liquid, wherein:

the fine particles are comprised of (a) activated porous carbon materials formed from carbonized plant-based materials treated with an acid or alkali having an absolute value of a zeta potential of not less than 10 mV but not more than 200 mV, (b) an amount of magnesium in the range of 0.01% by mass to 3% by mass, both inclusive, (c) an amount of potassium in the range of 0.01% by mass to 3% by mass, both inclusive, and (d) an amount of calcium in the range of 0.05% to 3% by mass, both inclusive, and the fine particles have modified surfaces to have increased positive or negative charges relative to an amount of positive or negative charges, respectively, that would be present had the surfaces not been modified, wherein, the porous carbon materials have at least one peak at not more than 10 nm in pore size distribution obtained by a non-localized density functional theory method, a ratio of a total volume of the pores having a pore size within a range of not more than 10 nm relative to a total volume of the pores having a pore size within a range of not more than 50 nm is not less than 0.1 but not more than 0.99, and the porous carbon materials contain C in an amount not less than 90.0% by mass.

5. The electrophoretic dispersion liquid according to claim 1, 2, 3, or 4, wherein the fine particles have modified surfaces to have increased positive charges relative to the amount of positive charges that would be present had the surfaces not been modified.

6. The electrophoretic dispersion liquid according to claim 1, 2, 3, or 4, wherein the fine particles have modified surfaces to have increased negative charges relative to the amount of negative charges that would be present had the surfaces not been modified.

7. The electrophoretic dispersion liquid according to claim 1, 2, 3, or 4 wherein the surfaces of the fine particles have amino groups, hydroxyl groups, carboxyl groups, ketone groups, ester groups, or a combination of them.

8. The image display according to claim 1, 2, 3, or 4 wherein the activated porous carbon materials formed from carbonized plant-based materials treated with an acid or alkali having specific surface area values, determined by a nitrogen BET method, of not less than 400 m$^2$/g and an average particle diameter of not more than 2μm.

9. The image display according to claim 8, wherein the activated porous carbon materials formed from carbonized plant-based materials treated with an acid or alkali having specific surface area values, determined by a nitrogen BET method, of not less than 400 m$^2$/g and an average particle diameter of not more than 0.5 μm.

10. An image display device comprising:
a first substrate facing a second substrate;
a first electrode on the first substrate;
a second electrode on the second substrate, the second electrode facing the first electrode;
an electrophoretic dispersion liquid sealed between the substrates; and
a plurality of fine particles dispersed in the electrophoretic dispersion liquid,
wherein, the fine particles are comprised of (a) activated porous carbon materials formed from carbonized plant-based materials treated with an acid or alkali having specific surface area values, determined by a nitrogen BET method, of not less than 100 m$^2$/g, and a pore volume, determined by an MP method, of not less than 0.1 cm$^3$/g, (b) an amount of magnesium in the range of 0.01% by mass to 3% by mass, both inclusive, (c) an amount of potassium in the range of 0.01% by mass to 3% by mass, both inclusive, and (d) an amount of calcium in the range of 0.05% to 3% by mass, both inclusive, and the fine particles have modified surfaces to have increased positive or negative charges relative to an amount of positive or negative charges, respectively, that would be present had the surfaces not been modified, wherein, the porous carbon materials have at least one peak at not more than 10 nm in pore size distribution obtained by a non-localized density functional theory method, a ratio of a total volume of the pores having a pore size within a range of not more than 10 nm relative to a total volume of the pores having a pore size within a range of not more than 50 nm is not less than 0.1 but not more than 0.99, and the porous carbon materials contain C in an amount not less than 90.0% by mass.

11. An image display device comprising:
a first substrate facing a second substrate;
a first electrode on the first substrate;
a second electrode on the second substrate, the second electrode facing the first electrode;
an electrophoretic dispersion liquid sealed between the substrates; and
a plurality of fine particles dispersed in the electrophoretic dispersion liquid,
wherein, the fine particles are comprised of (a) activated porous carbon materials formed from carbonized plant-based materials treated with an acid or alkali having specific surface area values, determined by a nitrogen BET method, of not less than 100 m$^2$/g, and at least one peak at not more than 10 nm in pore size distribution obtained by a non-localized density functional theory method, (b) an amount of magnesium in the range of 0.01% by mass to 3% by mass, both inclusive, (c) an amount of potassium in the range of 0.01% by mass to 3% by mass, both inclusive, and (d) an amount of calcium in the range of 0.05% to 3% by mass, both inclusive, and the fine particles have modified surfaces to have increased positive or negative charges relative to an amount of positive or negative charges, respectively, that would be present had the surfaces not been modified, wherein, the porous carbon materials have at least one peak at not more than 10 nm in pore size distribution obtained by a non-localized density functional theory method, a ratio of a total volume of the pores having a pore size within a range of not more than 10 nm relative to a total volume of the pores having a pore size within a range of not more than 50 nm is not less than 0.1 but not more than 0.99, and the porous carbon materials contain C in an amount not less than 90.0% by mass.

12. An image display device comprising:
a first substrate facing a second substrate;
a first electrode on the first substrate;
a second electrode on the second substrate, the second electrode facing the first electrode;
an electrophoretic dispersion liquid sealed between the substrates; and
a plurality of fine particles dispersed in the electrophoretic dispersion liquid,
wherein,
the fine particles are comprised of (a) activated porous carbon materials formed from carbonized plant-based materials treated with an acid or alkali having specific surface area values, determined by a nitrogen BET method, of not less than 100 $m^2/g$ and average particle size of not less than $1 \times 10^{-8}$ m but not more than $2 \times 10^{-4}$ m, (b) an amount of magnesium in the range of 0.01% by mass to 3% by mass, both inclusive, (c) an amount of potassium in the range of 0.01% by mass to 3% by mass, both inclusive, and (d) an amount of calcium in the range of 0.05% to 3% by mass, both inclusive, and
the fine particles have modified surfaces to have increased positive or negative charges relative to an amount of positive or negative charges, respectively, that would be present had the surfaces not been modified,
wherein,
the porous carbon materials have at least one peak at not more than 10 nm in pore size distribution obtained by a non-localized density functional theory method,
a ratio of a total volume of the pores having a pore size within a range of not more than 10 nm relative to a total volume of the pores having a pore size within a range of not more than 50 nm is not less than 0.1 but not more than 0.99, and
the porous carbon materials contain C in an amount not less than 90.0% by mass.

13. An image display device comprising:
a first substrate pair facing each other;
an electrophoretic dispersion liquid sealed between the substrates;
a first electrode on the first substrate;
a second electrode on the second substrate, the second electrode facing the first electrode;
a plurality of fine particles dispersed in the electrophoretic dispersion liquid,
wherein,
the fine particles are comprised of (a) activated porous carbon materials formed from carbonized plant-based materials treated with an acid or alkali having an absolute value of a zeta potential of not less than 10 mV but not more than 200 mV, (b) an amount of magnesium in the range of 0.01% by mass to 3% by mass, both inclusive, (c) an amount of potassium in the range of 0.01% by mass to 3% by mass, both inclusive, and (d) an amount of calcium in the range of 0.05% to 3% by mass, both inclusive, and
the fine particles have modified surfaces to have increased positive or negative charges relative to an amount of positive or negative charges, respectively, that would be present had the surfaces not been modified,
wherein,
the porous carbon materials have at least one peak at not more than 10 nm in pore size distribution obtained by a non-localized density functional theory method,
a ratio of a total volume of the pores having a pore size within a range of not more than 10 nm relative to a total volume of the pores having a pore size within a range of not more than 50 nm is not less than 0.1 but not more than 0.99, and
the porous carbon materials contain C in an amount not less than 90.0% by mass.

14. The image display according to claim 10, 11, 12, or 13, wherein the fine particles have modified surfaces to have increased positive charges relative to the amount of positive charges that would be present had the surfaces not been modified.

15. The image display according to claim 10, 11, 12, or 13 wherein the fine particles have modified surfaces to have increased negative charges relative to the amount of negative charges that would be present had the surfaces not been modified.

16. The image display accordingly to claim 10, 11, 12, or 13, wherein the surfaces of the fine particles have amino groups, hydroxyl groups, carboxyl groups, ketone groups, ester groups, or a combination of them.

* * * * *